United States Patent [19]

McDonough et al.

[11] Patent Number: 5,727,123
[45] Date of Patent: Mar. 10, 1998

[54] BLOCK NORMALIZATION PROCESSOR

[75] Inventors: John G. McDonough; Chienchung Chang; Randeep Singh; Charles E. Sakamaki; Ming-Chang Tsai; Prashant Kantak, all of San Diego, Calif.

[73] Assignee: QUALCOMM Incorporated, San Diego, Calif.

[21] Appl. No.: 575,303

[22] Filed: Dec. 20, 1995

Related U.S. Application Data

[62] Division of Ser. No. 197,417, Feb. 16, 1994.

[51] Int. Cl.$^6$ ............................................. G10L 3/00
[52] U.S. Cl. .............................................. 395/2.33
[58] Field of Search ..................... 395/2, 2.33, 2.28, 395/2.29, 2.31, 2.47, 2.09

[56] References Cited

U.S. PATENT DOCUMENTS 4,789,956  12/1988  Hiderbrandt .................. 364/736.5
5,414,796  5/1995   Jacobs et al. .................... 395/2.3
5,491,773  2/1996   Veldhius et al. ................ 395/2.28

FOREIGN PATENT DOCUMENTS 0280827  9/1988   European Pat. Off. .......... G10L 9/14
0291377  11/1988  European Pat. Off. .......... G10L 9/14
0308817  3/1989   European Pat. Off. .......... G10L 9/14

OTHER PUBLICATIONS

IEEE International Conference on Communication, ICC 90; Chung et al, "Gain Normalization in a 4200 BPS Homomorphic Vocoder", pp. 942–946, vol. 3, Apr. 1990.

Primary Examiner—Allen R. MacDonald
Assistant Examiner—Richemond Dorvil
Attorney, Agent, or Firm—Russell B. Miller; Sean English

[57] ABSTRACT

A method and apparatus for implementing a vocoder in a application specific integrated circuit (ASIC) is provided. The apparatus contains a DSP core that performs computations in accordance with a reduced instruction set (RISC) architecture. The circuit further includes a specifically designed slave processor to the DSP core referred to as the minimization processor. The apparatus further comprises a specifically designed block normalization circuitry.

5 Claims, 14 Drawing Sheets

FULL RATE

| LPC | 40 | | | | | | | |
|---|---|---|---|---|---|---|---|---|
| PITCH | 10 | | 10 | | 10 | | 10 | |
| CODEBOOK | 10 | 10 | 10 | 10 | 10 | 10 | 10 | 10 |

TOTAL = 160 (PLUS 11 CRC)

FIG. 4a

HALF RATE

| LPC | 20 | | | |
|---|---|---|---|---|
| PITCH | 10 | | 10 | |
| CODEBOOK | 10 | 10 | 10 | 10 |

TOTAL = 80

FIG. 4b

QUARTER RATE

| LPC | 10 | |
|---|---|---|
| PITCH | 10 | |
| CODEBOOK | 10 | 10 |

TOTAL = 40

FIG. 4c

EIGHTH RATE

| LPC | 10 |
|---|---|
| PITCH | 0 |
| CODEBOOK | 6 |

TOTAL = 16

FIG. 4d

BLOCK NORMALIZATION PROCESSOR

This is a Divisional of application Ser. No. 08/197,417, filed Feb. 16, 1994.

BACKGROUND OF THE INVENTION

I. Field of the Invention

The present invention relates to speech processing. More particularly, the present invention relates to a novel and improved method and apparatus for implementing a vocoder in an application specific integrated circuit (ASIC).

II. Description of the Related Art

Transmission of voice by digital techniques has become widespread, particularly in long distance and digital radio telephone applications. If speech is transmitted by simply sampling and digitizing, a data rate on the order of 64 kilobits per second (kbps) is required to achieve the speech quality of conventional analog telephones. However, through the use of speech analysis, followed by the appropriate coding, transmission, and synthesis at the receiver, a significant reduction in the data rate can be achieved. Apparatus that perform speech analysis and coding at the transmitter and synthesis at the receiver are known as vocoders.

The recent development of digital cellular telephone standards and systems have spurred the need for these vocoders. The desire for advanced vocoding algorithms which use the available transmission bandwidth more efficiently and reproduce the source speech more accurately at the receiver has increased the need for processors with greater computational capacity needed to perform these more complex vocoding algorithms.

Vocoders take advantage of long term and short term redundancies in speech, requiring computationally intensive numerical operations. Some of these operations include long sequence convolutions, matrix inversions, long sequence correlations, and so on. For these operation to be conducted in real time without incurring intolerable coding and decoding delays in the transmission of speech requires powerful computational resources.

The emergence of digital signal processors (DSPs) was an important factor in enabling the real time implementation of vocoder algorithms. DSPs are highly efficient in performing the arithmetic operations common to vocoder algorithms. Advances in DSPs have increased their computational capacity to rates of 40 million instructions per second (MIPS) and above.

The vocoding algorithm used for exemplary purposes is the variable rate code excited linear prediction (CELP) algorithm detailed in copending patent application Ser. No. 08/004,484, filed Jan. 14, 1993, entitled "Variable Rate Vocoder" and assigned to the assignee of the present invention. The material in the aforementioned patent application is incorporated by reference herein.

Shown below in Table I is a run time profile for a single 20 millisecond speech frame, of the encoding portion of the exemplary vocoding algorithm, as implemented using a typical DSP. Because the encoding portion of the exemplary vocoding algorithm requires significantly more processing than does the decoding portion, only the encoding process is detailed in Table I. The DSP referred to in Table I is clocked at 40 MHz and performs arithmetic operations and other operations, each in one or more clock cycles, depending on the operation. The first column presents the main operations of the exemplary vocoding algorithm. The second column presents the number of clock cycles required to accomplish each particular operation of the vocoder algorithm using the exemplary DSP. The third column presents the percentage of total processing required by the particular operation. The exemplary vocoding algorithm requires that all operations be performed within 20 milliseconds for real time operation of the exemplary vocoding algorithm. This places a requirement on the DSP chosen to implement the algorithm, such that the DSP be capable of operation at a clock rate at or above that required to complete the required processing within the 20 millisecond frame. For the typical DSP described by Table I, this restricts the number of clocks to 800,000.

TABLE I

| Routine | 40 MHz clocks | % of Total |
|---|---|---|
| LPC Analysis | 24810 | 3.89 |
| LPC to LSP Conversion | 48780 | 7.65 |
| Rate Decision | 330 | 0.05 |
| LSP Quantization | 660 | 0.10 |
| Unquantize LSP | 1110 | 0.17 |
| LSP/LPC Interpolation | 34590 | 5.42 |
| Pitch Search | 225570 | 35.36 |
| Codebook Search | 262380 | 41.13 |
| Synthesis | 34230 | 5.37 |
| Packing | 5490 | 0.86 |
| Total | 637950 | 100.00 |

As can be seen by Table I the pitch search and codebook search operations consume over 75 percent of the processing time in the encoding portion of the vocoder algorithm. Since the majority of the computational load lies within these two search algorithms, the primary objective of an efficient ASIC designed to perform vocoding is to reduce the number of clock cycles required to perform these two operations.

The method and apparatus of the present invention greatly decreases the number of instruction cycles necessary to perform these search operations. The present invention provides further methods and apparatus that are optimized for performing more efficiently operations that are of particular significance to vocoding algorithms. The application of the methods and apparatus of the present invention are not limited to performing the exemplary vocoding operation or even to performing speech encoding or decoding. It is envisioned that the methods and apparatus can be applied to any system that utilizes digital signal processing algorithms such as echo cancellers and channel equalizers.

SUMMARY OF THE INVENTION

The present invention is a novel and improved method and apparatus for performing a vocoding algorithm.

The exemplary embodiment of the present invention described herein is an ASIC implementation of a variable rate CELP algorithm detailed in the aforementioned copending patent application. The features of the present invention are equally applicable to any linear predictive coding (LPC) algorithm. The present invention introduces an architecture optimized to perform a vocoder algorithm in a reduced number of clock cycles and with reduced power consumption. The ultimate optimization goal was to minimize power consumption. Reducing the number of clocks required to perform the algorithm was also a concern as reduced clock rate both directly and indirectly acts to lower power consumption. The direct effect is due to the relationship between power consumption and clock rate for complementary metal-oxide semiconductor (CMOS) devices. The indirect effect is due to the square-law relationship between power consumption and voltage in a CMOS device, and the ability to lower voltage with decreasing clock rate. The efficiency of the vocoder ASIC is a measure of the amount of processing that is accomplished per clock cycle. Increasing the efficiency will then reduce the total number of clock cycles required to accomplish the algorithm.

A first technique to increase the efficiency in the performance of the vocoding algorithm is a specialized DSP core architecture. The DSP core of the exemplary embodiment increases memory throughput by providing three random access memory (RAM) elements. Each of the three RAM elements has a dedicated memory address generation unit. This triple-partitioning of the memory allows the efficient execution of such operations as recursive convolution by providing operands, computing results, and storing results all in a single cycle. The fetching of the operands, computation of results, and storage of results are pipelined so that the complete recursive convolution for a single result is performed over 3 cycles, but with a new result being produced every cycle. The triple-partitioned memory reduces clock cycle requirements for other operations in the vocoder algorithm as well. The efficient execution of the recursive convolution provides the most significant savings in the vocoder algorithm.

A second technique to increase efficiency in the performance of the vocoding algorithm is to provide a separate slave processor to the DSP core, referred to as the minimization processor. The minimization processor performs correlations, calculates mean squared errors (MSEs), and searches for the minimum MSE over data supplied to it by the DSP core. The minimization processor shares the computationally intensive correlation and minimization tasks with the DSP core. The minimization processor is provided with a control element that oversees the operation of the minimization processor and can curtail operation of the MSE minimization task under certain conditions. These conditions are those for which continued searching can not provide a MSE below the current minimum MSE due to mathematical constraints. The methods for curtailing the MSE minimization task are referred to as power saving modes of the minimization processor.

A third means to increase efficiency in the performance of the vocoding algorithm in the exemplary embodiment is to provide dedicated hardware for efficiently performing block normalization. In the computations of the vocoding algorithm there is a need to maintain the highest level of precision possible in the computations. By providing dedicated hardware, block normalization can be performed simultaneously with other operations in the vocoder algorithm, reducing the number of instruction cycles required to perform the vocoding algorithm.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIGS. 4a-4d are a set of charts illustrating the vocoder bit allocation for various rates and indicating the number of pitch and codebook subframes used for each rate;

FIGS. 6a-6d are block diagrams of an exemplary embodiment of the minimization processor of the present invention;

DETAILED DESCRIPTION OF THE PREFERRED EMBODIMENTS

Figure 1:
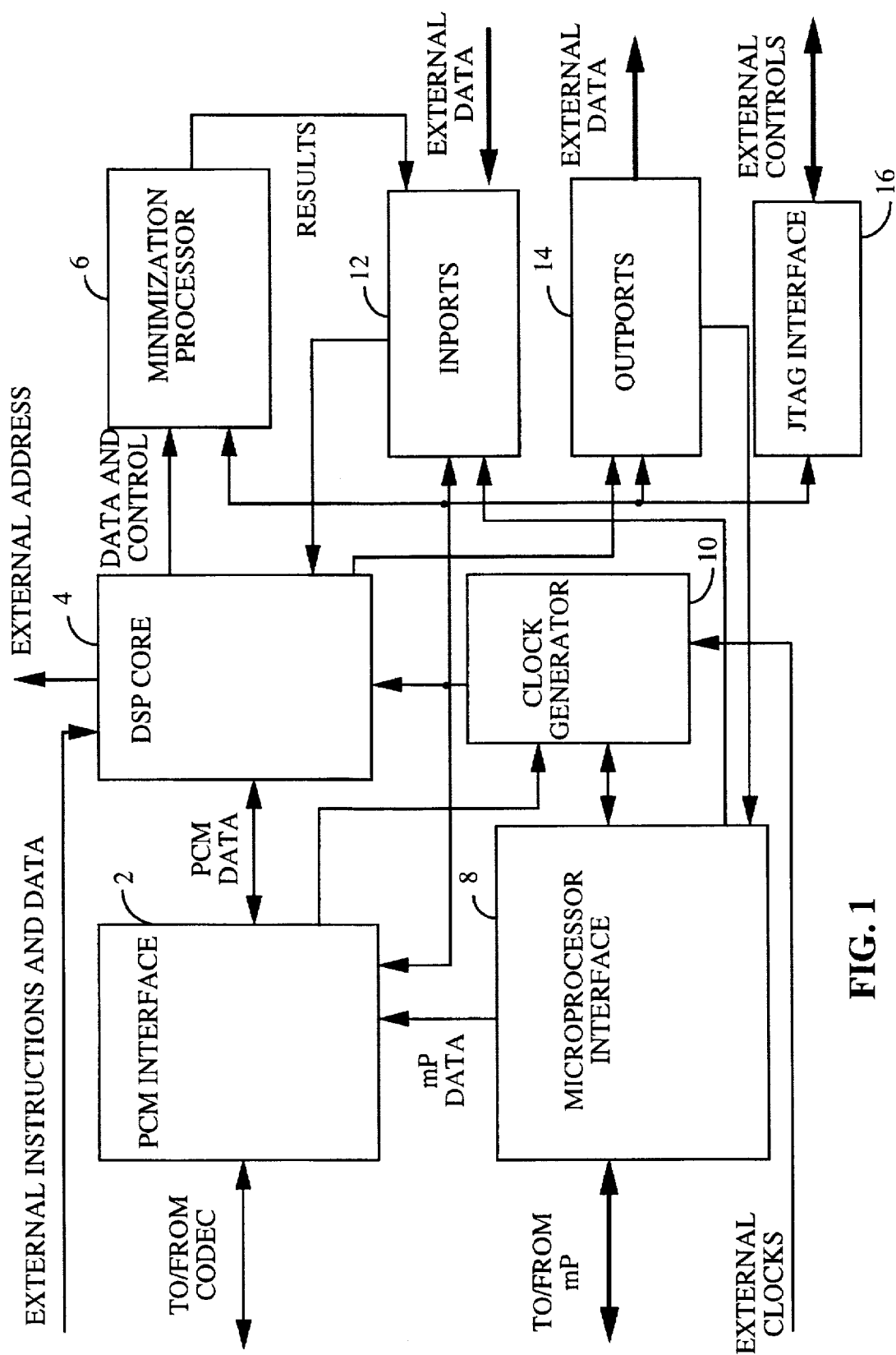
FIG. 1 is a block diagram of the apparatus of the present invention.

Referring now to the figures, DSP core 4 of FIG. 1 illustrated in FIGS. 5a–d is designed around a triple-partitioned random access memory (RAM), (RAM A 104, RAM B 122 and RAM C 182), a read only memory (ROM) (ROM E 114), and an efficient arithmetic logic unit (ALU) (ALU 143). The triple-partitioned RAM provides more efficient ALU utilization and increased RAM bandwidth over what can be achieved with a single RAM. A dedicated ROM, ROM E 114, provides 16-bit constants. The RAM partitions RAM A 104, RAM B 122 and RAM C 182 and the ROM, ROM E 114, provide data to ALU 143. RAM C 182 accepts and provides 32-bit data from and to ALU 143 while RAM A 104 and RAM B 122 accept and provide 16-bit data, making computations with 16-bit operands and storage of 32-bit results highly efficient.

Each partition has a dedicated address generation unit. RAM A 104 has address unit A 102, RAM B 122 has address unit B 120 and RAM C 182 has address unit C 186 and ROM E 114 has address unit E 112. Each of the address units is comprised of registers, multiplexers and adder/subtractor elements (not shown). In one clock cycle DSP core 4 may perform three memory operations, three address updates, an arithmetic operation (e.g. a multiply-accumulate-normalize), and a data move to minimization processor 6.

Instruction ROM, ROM I 194, stores the instructions which control the execution sequence of DSP core 4. The sequence of instructions stored in ROM I 194 describe the processing functions to be performed by DSP core 4. ROM I 194 has a dedicated address generation unit, IP counter and stack 196.

The RAM address generation units or register files, address unit A 102, address unit B 120 and address unit C 186, provide address and data for corresponding RAM operations. Data may be moved from register file elements to other register file elements within the same address unit, or to the respective RAM. In the exemplary embodiment, address unit A 102 provides data through multiplexer 106 to RAM A 104, address unit B 120 provides data through multiplexer 124 to RAM B 122 and address unit C 186 provides data through multiplexer 180 to RAM C 182.

Register file elements accept immediate data, IMM (as illustrated in FIGS. 5a–d), data from other register file elements within the same address unit, or data from RAM. Henceforth, in all cases, mention of the words "immediate data" will pertain to the data provided by instruction decoder 192. In the exemplary embodiment, RAM A 104 provides data through multiplexer 100 to address unit A 102, RAM B 122 provides data through multiplexer 118 to address unit B 120, and RAM C 182 provides data through multiplexer 184 to address unit C 186. Each address unit provides for automatic post-increment and post-decrement by an internally provided adder/subtractor (not shown). In the exemplary embodiment, address unit B 120 provides automatic modulo addressing and two dedicated register file elements (not shown) used as pointers for direct memory access (DMA).

Address unit E 112 is optimized for coefficient retrieval. It contains a base register which accepts immediate data through multiplexer 110, and an offset register which accepts immediate data through multiplexer 110 or data from an accumulator (COREG 164 or C1REG 166) through multiplexers 168 and 110. The offset register provides for automatic post-increment and post-decrement by means of an internal adder/subtactor (not shown).

IP counter and stack 196 contains address pointers which perform the function of addressing ROM I 194. The address sequencing is controlled by instruction decoder 192. Address data is moved either internally within IP counter and stack 196, or accepted as immediate data.

Data may be moved from RAM A 104, RAM B 122 or RAM C 182 to registers within ALU 143. Data may also be moved from an accumulator (COREG 164 or C1REG 166) to RAM A 104, RAM B 122 or RAM C 182. Data may be moved from OREG 162 to RAM C 182.

RAM A 104 accepts data from address unit A 102 through multiplexer 106. RAM A 104 also accepts data from an accumulator (COREG 164 or C1REG 166) through multiplexers 168 and 106. RAM B 122 accepts data from address unit B 120 through multiplexer 124. RAM B 122 also accepts data from an accumulator (COREG 164 or C1REG 166) through multiplexers 168 and 124. RAM B 122 also accepts data from DMA_INPUT (as illustrated in FIGS. 5a–d) or from INREG 128 through multiplexer 124. RAM C 182 accepts data from address unit C 186 through multiplexer 180. RAM C also accepts data from an accumulator (COREG 164 or C1REG 166) through multiplexers 168 and 180. RAM A 104 provides data to address unit A 102, through multiplexer 100, and to AREG 130 through multiplexer 108. RAM B 122 provides data to address unit B 120 through multiplexer 118, to RAMB_DOUT (as illustrated in FIGS. 5a–d), to SREG 136 through multiplexer 126, to BREG 134 through multiplexer 116 and to DREG 156 through multiplexer 158.

AREG 130 accepts immediate data, data from ROM E 114, or data from RAM A 104 through multiplexer 108. BREG 134 accepts immediate data, data from ROM E 114, or data from RAM B 122 through multiplexer 116. BREG 134 also accepts data from an accumulator (COREG 164 or C1REG 166) through multiplexers 168 and 116.

COREG 164 and C1REG 166 accept data through multiplexer 148, from RAM C 182, from summer 146, from logical AND element 144, or from logical OR element 142.

Shift index register SREG 136 accepts immediate data or data from RAM B 122 through multiplexer 126.

ALU 143 performs multiply, add, subtract, multiply-accumulate, multiply-add, multiply-subtract, round, increment, clear, negate, and logical AND, OR, and INVERT operations. Inputs to multiplier 132, AREG 130 and BREG 134 are gated (gating not shown), reducing power consumption in multiplier 132 by insuring that inputs change only when a multiply is performed. ALU 143 provides two 36-bit accumulators (COREG 164 and C1REG 166) for efficiency and two barrel shifters, barrel shifter 140 and barrel shifter 150, for normalization. Shifts up to 16-bit positions left or right are provided by barrel shifter 140 and barrel shifter 150. The shift index is specified either explicitly through immediate data or by dedicated shift index register SREG 136 through multiplexer 149. Shift index register, SREG 136 in conjunction with barrel shifters 140 and 150, bitwise logical OR element 160 and OREG 162 are provided to minimize overhead in performing block normalization. ALU 143 provides status to instruction decoder 192 allowing conditional jumps based on the arithmetic and logical states of COREG 164 and/or C1REG 166. For example, in the exemplary embodiment, the signs for the values in COREG 164 and C1REG 166 are compared to provide conditional jump on sign change. A jump occurs when immediate data is provided to IP counter and stack 196. Accumulator overflow and underflow are detected and saturation is performed automatically by providing the hexadecimal value 0x7FFFFFFF in the case of overflow and 0x80000001 in the case of underflow in accordance with two's complement arithmetic.

The instruction execution sequence is fetch, decode, execute. An address value is provided by IP counter and stack 196 to instruction ROM I 194, which in response provides an instruction to instruction decoder 192. Instruction decoder 192 in response to this input instruction, decodes the instruction and provides control signals to the appropriate elements within DSP core 4 for execution of the instruction.

Dedicated loop counter and stack 190 along with IP counter and stack 196 provide low overhead nested subroutine calls and nested loops. Instruction fetch is disabled during single instruction loops, decreasing power consumption. Loop counter and stack 190 accepts immediate data through multiplexer 188 for performing fixed length loops. Loop counter and stack 190 also accepts data from an accumulator (COREG 164 C1REG 166) through multiplexers 168 and 188 for performing variable length loops. A 256-word static instruction cache (not shown) within ROM I 194 provides low-power instruction fetch for the most frequently executed loops and subroutines. A WAIT instruction disables instruction fetch and instruction decode pending an event, decreasing power consumption. Examples of such events may include a DMA transfer, a timing strobe from PCM interface 2, or an external event.

External data and control are provided to DSP core 4 through PORT_INPUT (as illustrated in FIGS. 5a–d), DMA_INPUT from PCM interface 2, and static test bits used in conditional jump instructions. Data is provided externally by DSP core 4 through CREG (as illustrated in FIGS. 5a–d, 6a–b) and RAMB_DOUT. DMA between DSP core 4 and PCM interface 2 is performed by cycle stealing as is known in the art. Data from COREG 164 or C1REG 166 is provided through multiplexer 168, in conjunction with the OUTREG_EN (as illustrated in FIGS. 5a–d, 6a–b) signal from instruction decoder 192. An active OUTREG_EN signal signifies the presence of valid CREG data provided to minimization processor 6.

Figure 6A:
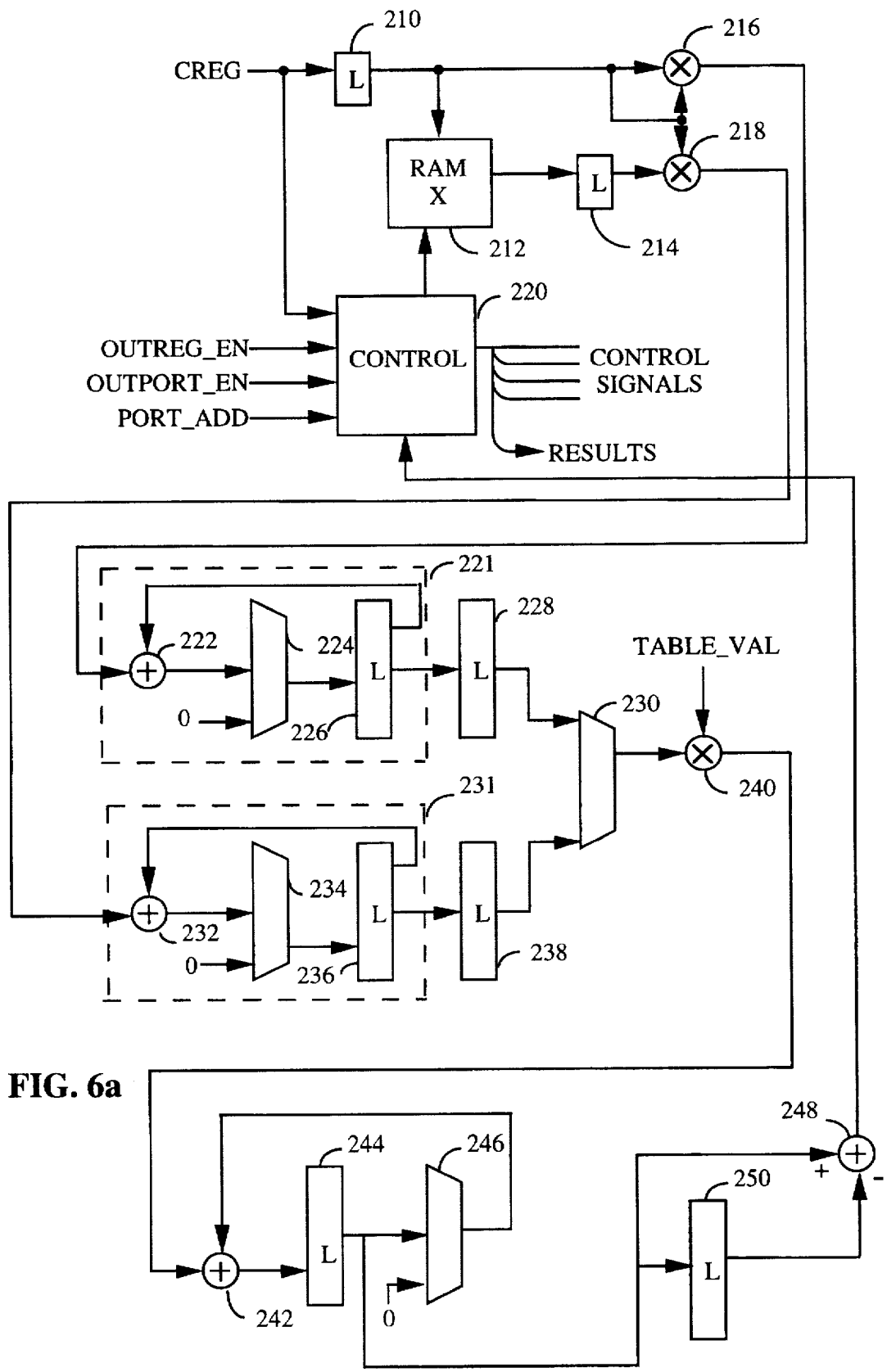
Figure 6B:
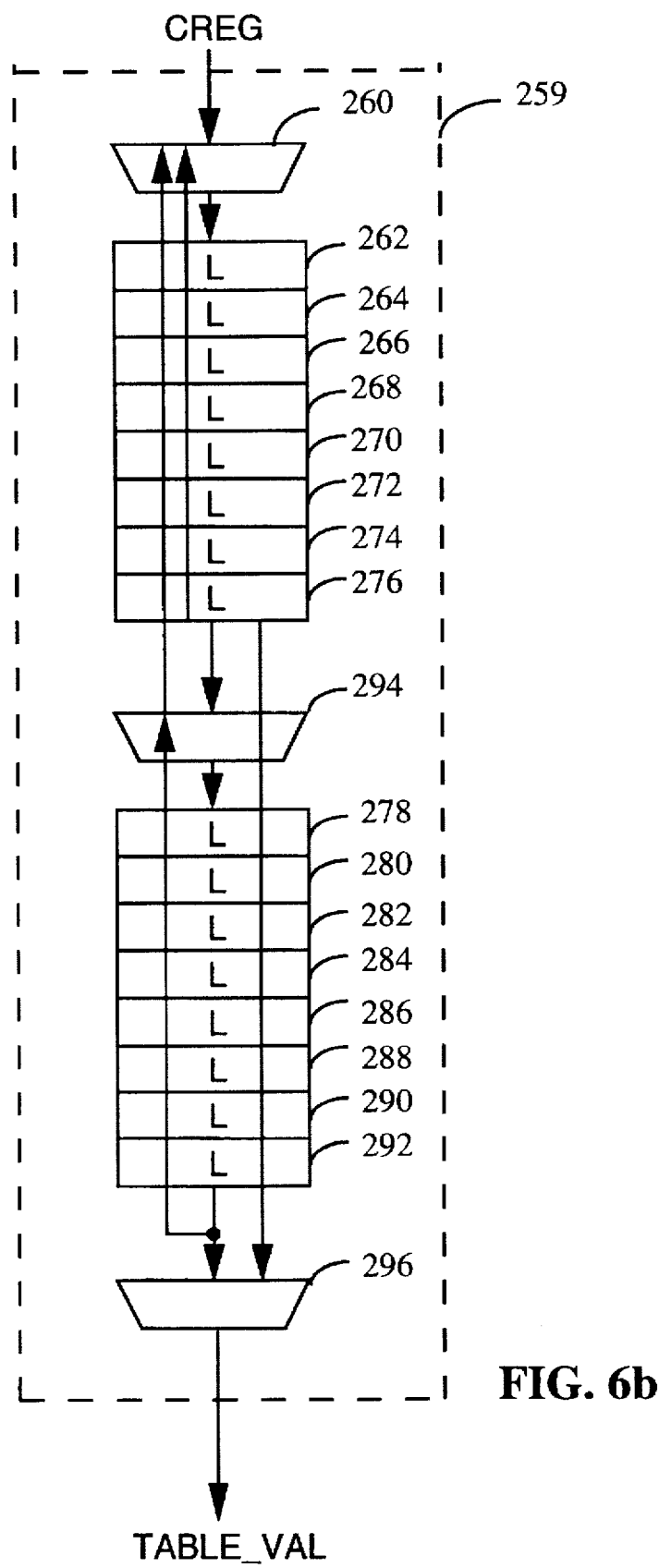

Minimization processor 6, illustrated in FIGS. 6a–b, aids in the computationally intense portions of the pitch and codebook searches. To perform a minimization procedure, minimization processor 6 receives a sequence of perceptually weighted input speech samples, a set of gain values, and a set of synthesized speech sample sequences from DSP core 4. Minimization processor 6 calculates the auto-correlation of the synthesized speech and the cross-correlation between the synthesized speech and the perceptually weighted input speech. From these correlations a relative measure of the mean-square-error (MSE) between the synthesized speech and the input speech is determined as a function of synthesized speech gain and index. Minimization processor 6 reports the index and gain resulting in the minimum MSE. Power saving features abort MSE calculations when further minimization is not possible. Minimization processor 6 communicates with DSP core 4 through CREG, port I/O, and dedicated DSP core instructions.

The operation of minimization processor 6 is determined by control 220. Control 220 comprises a counter to keep track of current index values, registers to hold the optimal pitch or codebook search results, address generation circuitry for accessing RAM X 212, and input/output circuitry. Additionally, control element 220 is responsible for controlling select signals on multiplexers 224, 234, 230 and 246, and enables on latches 210, 214, 226, 228, 236, 238, 244 and 250. Control 220 also monitors various values within elements in minimization processor 6, controls power saving modes which curtail searches under certain predetermined search termination conditions, and controls the circulation of gain values in circular buffer 259.

Furthermore, control 220 is responsible for performing input/output operations. Control 220 is responsible for providing the minimization results to DSP core 4 (i.e. the best pitch lag and pitch gain or the best codebook index and codebook gain determined in their respective searches) through inports 12. The OUTREG_EN signal is provided to control element 220 to indicate that the data on the input to latch 210 is valid and is present on the accumulator output signal CREG. Control 220 in response generates an enable signal and provides the enable signal to latch 210 to receive the data.

The OUTPORT_EN (as illustrated in FIGS. 5a–d, 6a–b) and PORT_ADD (as illustrated in FIGS. 5a–d, 6a–b) signals are provided to control element 220 from DSP core 4. The PORT_ADD signal provides an address to minimization processor 6. Minimization processor 6 will accept data from CREG when the PORT_ADD value specifies data for minimization processor 6 and OUTPORT_EN indicates a valid PORT_ADD value. Control and data are provided to minimization processor 6 as described above.

Referring to FIG. 1 which is an exemplary block diagram of the architecture of the present invention. PCM Interface 2 receives from and provides to a codec (not shown) pulse code modulation (PCM) speech sample data which in the exemplary embodiment are in the form of µ-law or A-law companded sample data or linear sample data. PCM interface 2 receives timing information from clock generator 10 and receives data and control information from microprocessor interface 8.

PCM interface 2 provides to DSP core 4 the PCM speech sample data it received from the codec (not shown) for encoding. PCM interface 2 receives from DSP core 4 PCM speech sample data that is then provided to the codec (not shown). The PCM data is transferred between DSP core 4 and PCM interface 2 via DMA. PCM interface 2 provides timing information to clock generator 10, based on the timing of samples received from the codec (not shown).

DSP core 4 provides data and control information to its co-processor, minimization processor 6. DSP core 4 also provides data to outports 14 and receives data from inports 12. DSP core 4 receives timing information from clock generator 10. DSP core 4 is also capable of providing external address information and receiving external instruction and data.

Minimization processor 6 receives timing information from clock generator 10, and receives data and control from DSP core 4. Minimization processor 6 provides results of minimization procedures to DSP core 4 via inports 12.

Clock generator 10 provides timing information to all other blocks. Clock generator 10 receives external clock signals and receives timing information from microprocessor interface 8 and from PCM interface 2.

Joint Test Action Group (JTAG) interface 16 provides the ability to test the functionality of the ASIC. JTAG interface 16 receives external data and control information and provides external data.

Outports 14 receives data from DSP core 4 and provides this data to microprocessor interface 8 and may also provide data to external devices (not shown).

Inports 12 receives data from microprocessor interface 8 and from minimization processor 6, and provides this data to DSP core 4. Inports 12 may also receive data from external devices (not shown) and provide this data to microprocessor interface 8.

Microprocessor interface 8 receives from and provides to a microprocessor (not shown) data and control information. This information is provided to the other blocks.

In the exemplary embodiment of the present invention, the Vocoder ASIC performs a variable rate CELP algorithm which is detailed in copending U.S. patent application Ser. No. 08/004,484, filed Jan. 14, 1993, entitled "Variable Rate Vocoder" and assigned to the assignee of the present invention.

Figure 2:
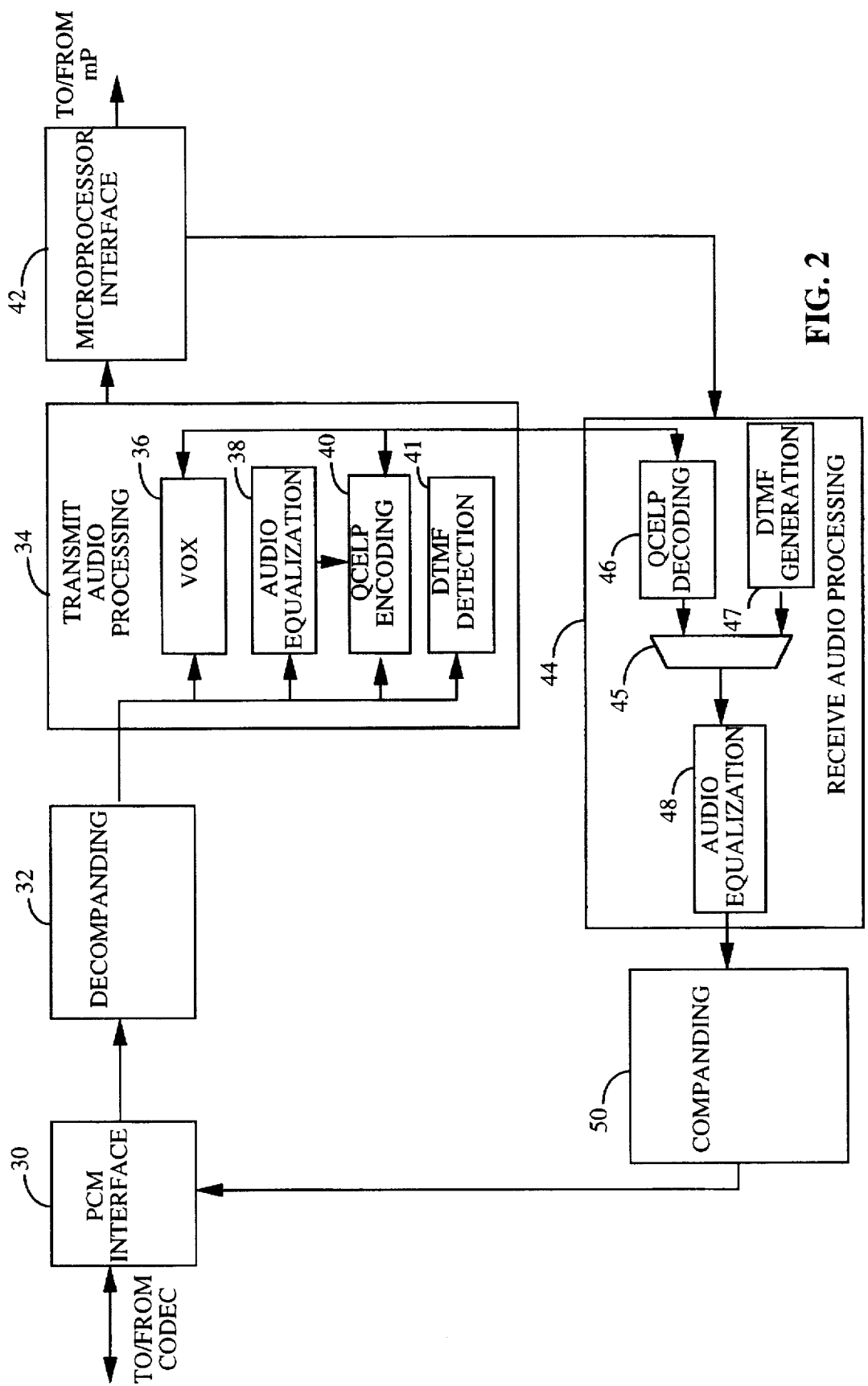
FIG. 2 is a functional illustration of the operation of the present invention.

FIG. 2 illustrates the main functions performed in the ASIC. Referring to FIG. 2, the samples to be encoded are provided to the vocoder ASIC through PCM interface 30 from a codec (not shown). These samples are then provided to decompanding element 32 which converts the µ-law or A-law samples to linear samples. Samples provided in linear format are passed through decompanding element 32 without change. Linear samples are provided to transmit audio processing element 34 which functionally comprises voice operated switch (VOX) 36, audio equalization element 38, QCELP encoding element 40, and dual tone multi-frequency (DTMF) detection element 41. Transmit audio processing element 34 then provides the encoded speech packet through microprocessor interface 42 to a microprocessor (not shown) external to the ASIC.

Encoded speech packets are provided by a microprocessor (not shown) through microprocessor interface 42 to receive audio processing element 44 where they are decoded into speech samples. Receive audio processing element 44 functionally comprises QCELP decoding element 46, audio equalizer 48, and DTMF generation element 47. The decoded samples are provided to companding element 50 which converts the linear samples to µ-law or A-law format or passes linear samples without change to PCM interface 30. The ASIC provides the decoded samples through PCM interface 30 to a codec (not shown) external to the ASIC.

The decompanding operation illustrated in FIG. 2 as decompanding element 32 and the companding operation illustrated in FIG. 2 as companding element 50 are performed by DSP core 4 illustrated in FIGS. 5a–d. The transmit audio processing operations illustrated in FIG. 2 as transmit audio processing element 34 are performed by DSP core 4 and minimization processor 6 illustrated in FIGS. 6a–b. The receive audio processing operations illustrated in FIG. 2 as receive audio processing element 44 are performed by DSP core 4 illustrated in FIGS. 5a–d.

In the exemplary embodiment, samples provided from the codec (not shown) in 8-bit μ-law or 8-bit A-law format are converted into 14-bit linear format. The relationship between μ-law and linear is shown in equation 1 below:

$$2Y = -1^S(33+2M)2^N - 33 \quad (1)$$

where Y is a linear value (−4015.5 to 4015.5), N is an exponent (0 to 7), M is a magnitude value (0 to 15), and S is a sign (0 for positive, 1 for negative). The relationship between A-law and linear is shown in equations 2 and 3 below:

$$2Y = -1^S(1+2M)2^2Y \text{ for } N=0 \quad (2)$$

$$2Y = -1^S(33+2M)2^N \text{ for } N=1, \ldots, 7 \quad (3)$$

where Y is linear value (−4032 to 4032), N, M and S, are as described above.

Referring to FIGS. 5a–d, the samples provided through PCM interface 30 of FIG. 2, are converted to linear format by means of a look up table stored in ROM E 114. In a preferred embodiment, half-size 128×14 μ-law to linear and A-law to linear lookup tables are employed to perform the conversion. The preferred embodiment takes advantage of full-sized conversion tables having the property shown in equation 4 below.

$$ROM(n+128) = -ROM(n), \ 0 \leq n \leq 127 \quad (4)$$

Removal of any DC component from the input speech signal is required before computation of the autocorrelation coefficients and LPC coefficients. The DC blocking operation is done in DSP core 4 by subtracting a low-pass filtered speech sample mean, the DC-bias, from each input sample in the current window. That is, the DC-bias for the current frame is a weighted average of the sample mean of the current and previous frames. The computation of the DC-bias is shown in equation 5 below:

$$DC\_bias = a(mean(previous\_frame)) + (1-a)mean(current\_frame) \quad (5)$$

where a=0.75 in the exemplary embodiment. Low pass filtering is used to prevent large discontinuities at the frame boundaries. This operation is performed in DSP core 4 by storing the sample mean for the current frame and for the previous frame in one of the RAM elements (i.e. RAM A 104, RAM B 122 or RAM C 182) with the interpolation factor, a, provided by ROM E 114. The addition is performed by summer 146 and the multiplication by multiplier 132. The DC blocking function can be enabled or disabled under microprocessor control.

The DC-free input speech signal, s(n), is then windowed to reduce the effects of chopping the speech sequence into fixed-length frames. The Hamming window function is used in the exemplary embodiment. For frame length $L_A=160$ the windowed speech $s_W(n)$ is calculated as shown in equation 6 below:

$$s_W(n) = s(n+60)W_H(n), \ 0 \leq n \leq L_A - 1 \quad (6)$$

where the Hamming window is defined in equations 7 and 8 below.

$$W_H(n) = 0.54 - 0.46 \cos[2\pi n/(L_A - 1)], \ 0 \leq n \leq L_A - 1 \quad (7)$$
$$= 0, \quad \text{otherwise} \quad (8)$$

In a preferred embodiment, since $W_H(n)$ is an even-symmetric function, a lookup table of 80 coefficients, half the number of Hamming window coefficients, are stored in ROM E 114. Windowing may then be performed by providing the window coefficient, $W_H(n)$, from ROM E 114, in accordance with an address value provided by address unit E 112, through multiplexer 108 to AREG 130. AREG 130 provides this data to a first input of multiplier 132. Speech sample, s(n+60) is provided by RAM B 122 to BREG 134. BREG 134 provides this value to a second input of multiplier 132. The output of multiplier 132 is the windowed speech sample which is provided to COREG 164 and then provided to RAM C 182 through multiplexer 168.

The block normalization procedure consists of two functional parts: determination of the normalization factor and normalization of the intended data. In the exemplary embodiment, the data is stored in two's complement notation. The windowed samples are computed according to equation 7 above. On a normalization instruction, DETNORM, from ROM I 194, the resulting windowed sample value generated in COREG 164 is subjected to the following procedure. If the value in COREG 164 is negative then inversion element 152 inverts the binary digits of the number and passes the bit inverted value to a first input of summer 146. The second input of summer 146 is provided with a zero through multiplexers 137 and 138. Summer 146 then adds one, through its carry input (not shown) to the bit inverted value. If the value in COREG 164 is positive, the value is passed through multiplexers 168 and 154, inversion element 152 and summer 146 unaffected. The purpose of this procedure is to compute the absolute value of COREG 164. The absolute value is then provided to a first input of bitwise logical OR element 160. The second input of bitwise logical OR element 160 is provided by OREG 162. The absolute value calculation described above is shown in equations 8a–c below.

$$OREG_{new} = (ABS(COREG))OR(OREG_{old}) \quad (8a)$$

where $$ABS(COREG) = COREG, \quad COREG \geq 0 \quad (8b)$$

$$= -COREG, \quad COREG < 0 \quad (8c)$$

The operation described in equations 8a–c can be similarly performed on C1REG 166 using a DETNORM instruction if the intended data for normalization resides in C1REG 166. OREG 162 is cleared at the beginning of the normalization operation. This procedure repeats for all the windowed samples (intended data) such that, at the end of the operation, the value stored in OREG 162 represents the bitwise logical OR of the absolute values of all the windowed samples. From the most significant bit set in OREG 162 a scaling factor is determined since the value in OREG 162 is greater than or equal to the largest magnitude value in the block of windowed samples. The value in OREG 162 is transferred through multiplexer 168 to RAM C 182. This value is then loaded into COREG 164. The normalization factor is determined by counting the number of left or right shifts of the value in COREG 164 required so that shifts of the windowed data by this amount will provide values with the desired peak magnitude for the subsequent operation. This scaling factor is also known as the normalization factor. Because normalization is performed through shifts, the normalization factor is a power of two.

In order to maintain the windowed samples in the highest precision possible, the intended values are multiplied by a normalization factor so that the largest magnitude value occupies the maximum number of bits provided for in the subsequent operation. Since the normalization factor is a powers of two, normalization on the intended data can be achieved by simply performing a number of shifts as specified by the normalization factor. The normalization factor is provided by RAM B 122 through multiplexer 126 to SREG 136. The windowed samples are then provided from RAM C 182, through multiplexer 158 to DREG 156. DREG 156 then provides these values to barrel shifter 150, through multiplexer 154 and disabled inverter 152, where they are shifted in accordance with the normalization factor provided to barrel shifter 150 by SREG 136 through multiplexer 149. The output of barrel shifter 150 is passed through disabled adder element 146 and multiplexer 148 to COREG 164. The normalized windowed samples are then passed through multiplexer 168 and provided through multiplexers 124 and 180 to RAM B 122 and RAM C 182 respectively. This results in two copies of the normalized windowed samples in RAM, making the subsequent calculation of the autocorrelation coefficients more efficient.

The computation of the P+1 autocorrelation coefficients R(k) is performed in accordance with equation 9 below:

$$R(k) = \sum_{m=0}^{L_A-1-k} s_w(m)s_w(m+k), 0 \leq k \leq P \quad (9)$$

where P is the order of the formant prediction filter in the encoder. In the exemplary embodiment, P=10. The normalized windowed samples, $s_w(m)$ are provided by RAM B 122 through multiplexer 116 and BREG 134 to a first input of multiplier 132. Delayed versions of the normalized windowed samples, $s_w(m+k)$, are provided by RAM C 182 through multiplexer 148 and C1REG 166, RAM A 104 and AREG 130 to a second input of multiplier 132. Each R(k) is the accumulation of $L_A-k$ values. For the first iteration of each R(k), the output of multiplier 132 is provided to accumulator COREG 164 through multiplexer 138 and barrel shifter 140, to a first input of summer 146. Multiplexer 154 provides zero to a second input of summer 146 through disabled barrel shifter 150. For subsequent iterations, the output of multiplier 132 is provided to a first input of summer 146 through multiplexer 138 and barrel shifter 140. A second input of summer 146 is provided with the output of COREG 164 through multiplexers 168 and 154, disabled inversion element 152 and disabled barrel shifter 150. This procedure is repeated for each R(k).

None of the autocorrelation coefficients is larger R(0). In the exemplary embodiment, after R(0) is calculated, its normalization factor is determined. This normalization factor is then applied to the already computed R(0) and the rest of the autocorrelation coefficients as they are computed. Normalization of the autocorrelation coefficients at this stage maximizes the precision for the subsequent computation of the LPC coefficients.

Figure 3:
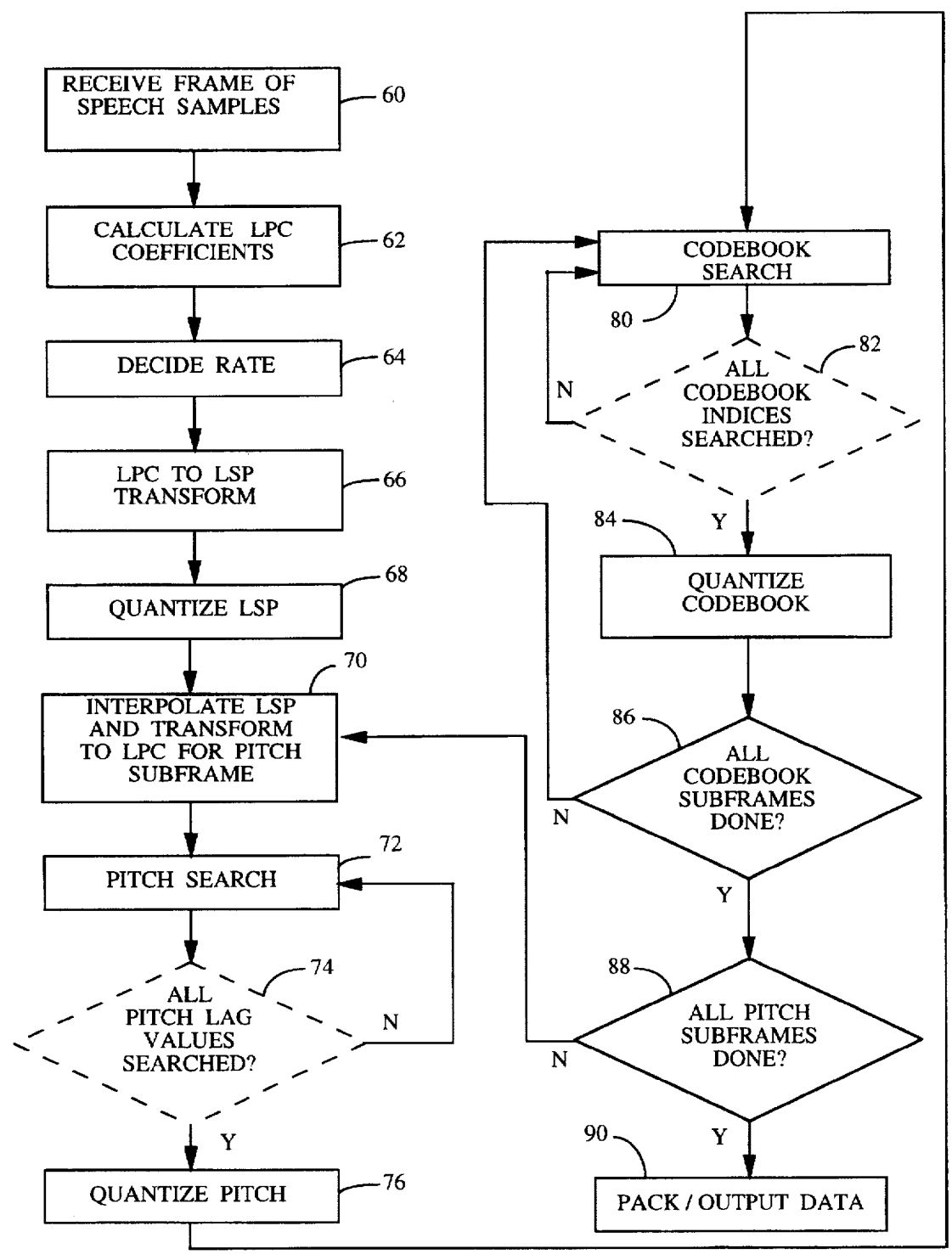
FIG. 3 is a flowchart of the exemplary encoding operation of the present invention.
Figure 5A:
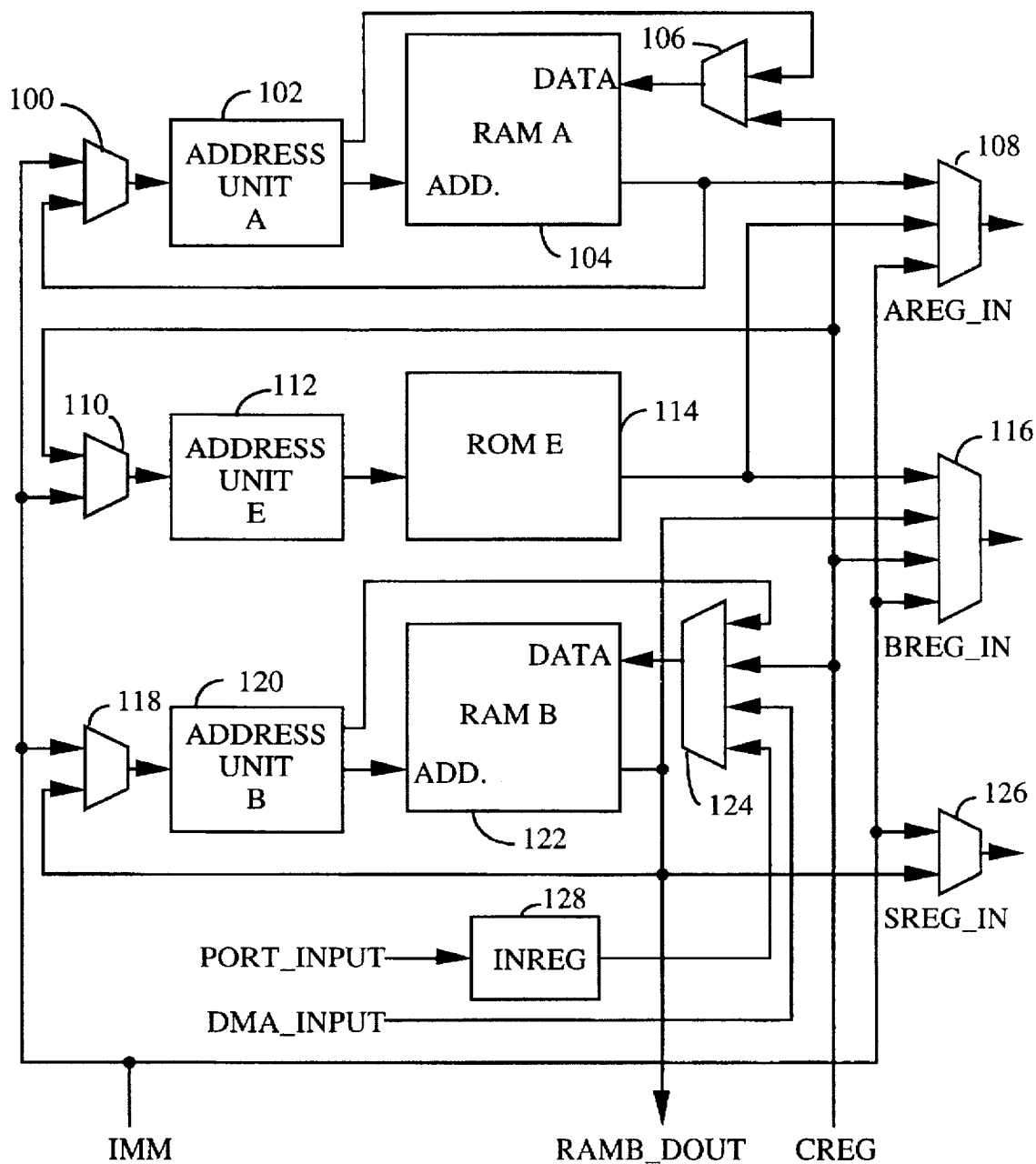
FIGS. 5a-5d are block diagrams of an exemplary embodiment of the DSP core of the present invention.
Figure 5B:
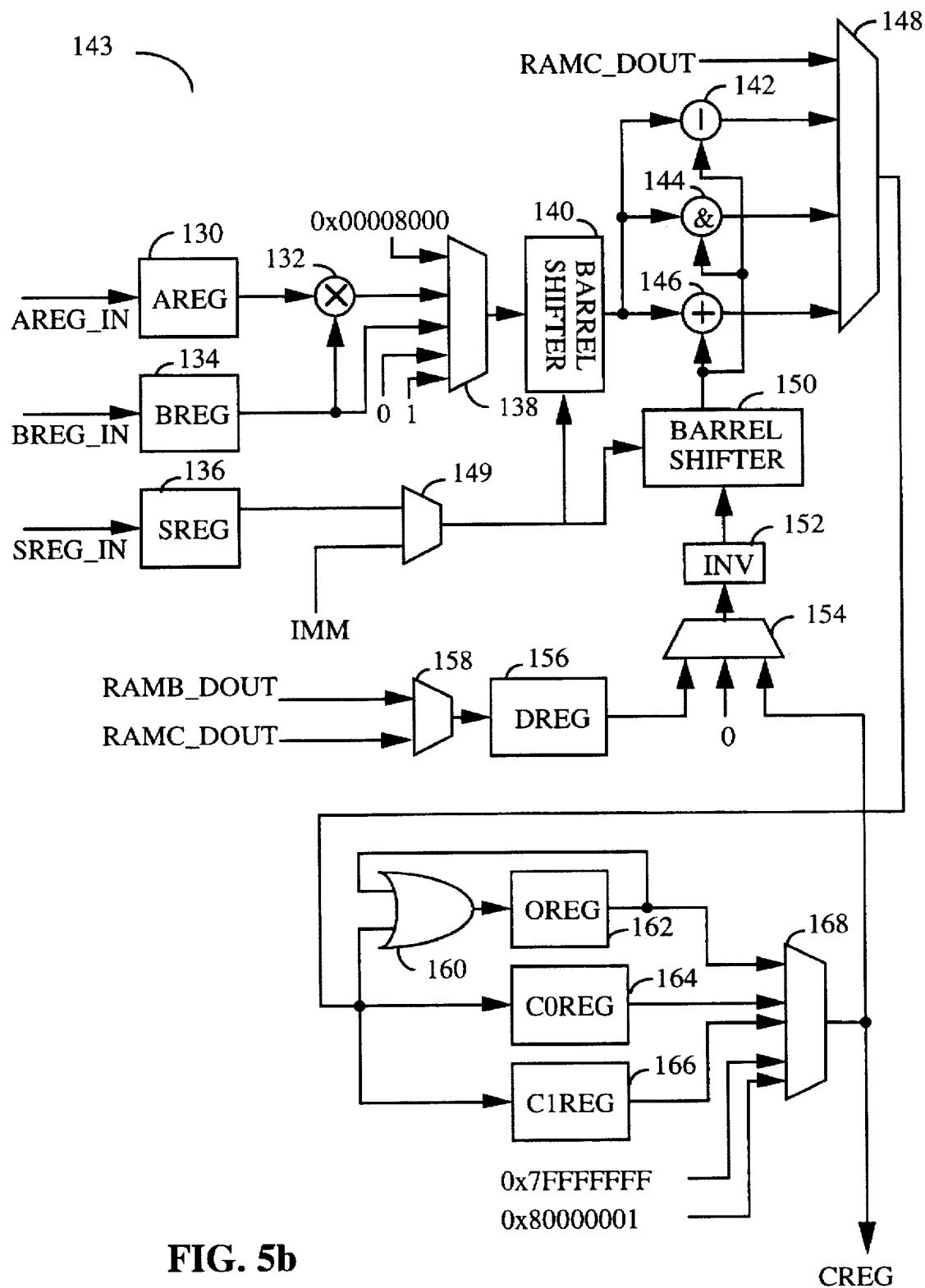
Figure 5C:
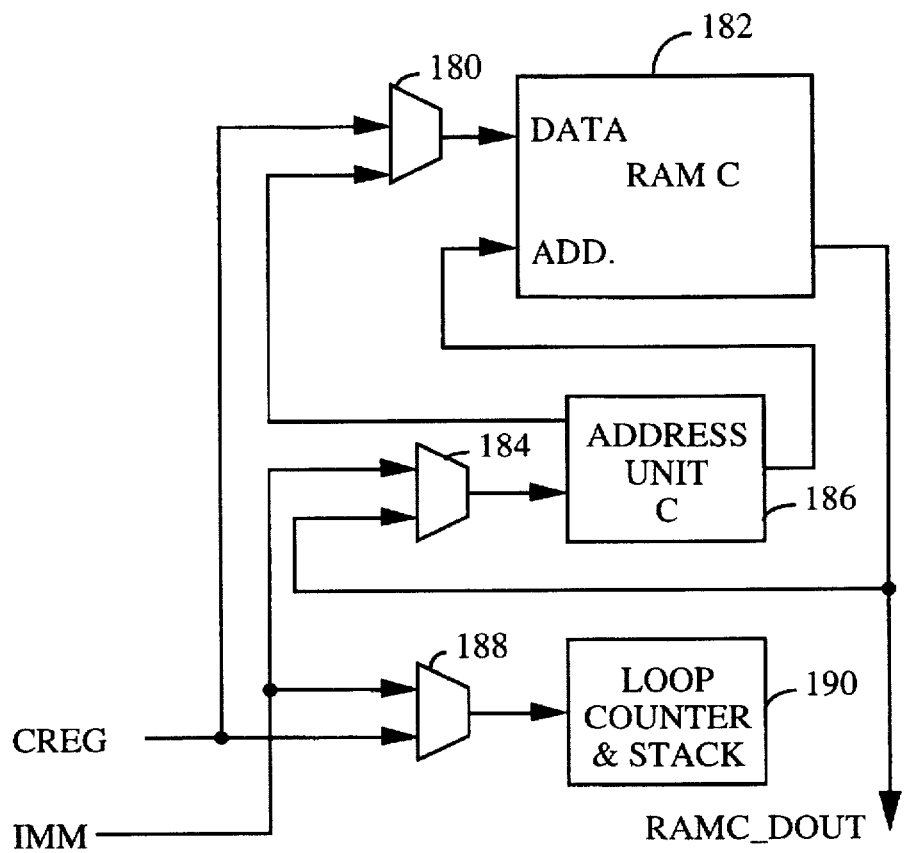
Figure 5D:
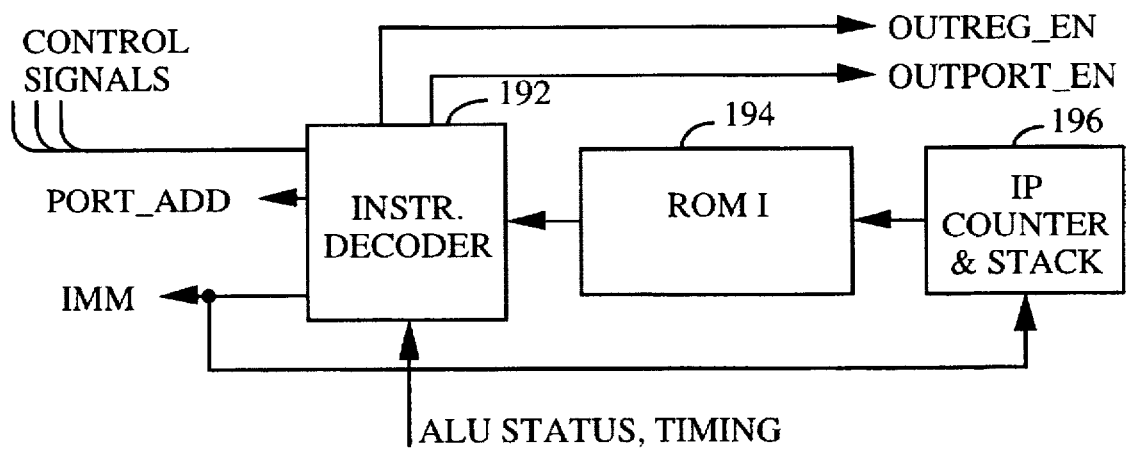

Now proceeding to block 62 of FIG. 3, the LPC coefficients are calculated to remove the short-term correlation (redundancies) in the speech samples.

The formant prediction filter with order P has transfer function, A(z), described by equation 10 below.

$$A(z) = 1 - \sum_{i=1}^{P} a_i z^{-i}, P = 10 \quad (10)$$

Each LPC coefficient, $a_i$, is computed from the autocorrelation values of the normalized, windowed input speech. An efficient iterative method, called Durbin's recursion (See Rabiner, L. R. and Schafer, R. W., "*Digital Processing of Speech Signals*," Prentice-Hall, 1978) is used in the exemplary embodiment to compute the LPC coefficients. This iterative method is described in equations 11 through 17 below.

$$E^{(0)} = R(0), i=1 \quad (11)$$

$$k_i = \left[ R(i) - \sum_{j=1}^{i-1} a_j^{(i-1)} R(i-j) \right] / E^{(i-1)} \quad (12)$$

$$a_i^{(i)} = k_i \quad (13)$$

$$a_j^{(i)} = a_j^{(i-1)} - k_i a_{i-j}^{(i-1)}, 1 \leq j \leq i-1 \quad (14)$$

$$E^{(i)} = (1 - k_i^2) E^{(i-1)} \quad (15)$$

If $i<P$ then increment $i$ and continue to 12 \quad (16)

The final LPC coefficient values are: $a'_j = a_j^{(P)}, 1 \leq j \leq P$ \quad (17)

Durbin's iterative algorithm works only when the input signal has zero mean, requiring that any DC-bias be removed before the autocorrelation calculations are performed as described previously.

In the exemplary embodiment, 15 Hz of bandwidth expansion is utilized to ensure the stability of the formant prediction filter. This can be done by scaling the poles of the formant synthesis filter radially inwards. Bandwidth expansion is achieved by scaling the LPC coefficients in accordance with equation 18 below:

$$a_i = \beta^i a'_i, 1 \leq i \leq P \quad (18)$$

where $\beta=0.9883$ in the exemplary embodiment. The 10 bandwidth expansion coefficients, $\beta^i$ for $1 \leq i \leq P$, are stored in a look-up table provided in ROM E 114. The functions of block 62 are performed in DSP core 4.

Now proceeding to block 64 of FIG. 3, an encoding rate for the current frame of speech data is determined. The rate derision is based on a measure of voice activity in each frame. The voice activity, in turn, is measured in accordance with the frame energy, R(0), described previously. To determine the encoding rate for frame i, the frame energy is compared with the three thresholds defined in equations 19 through 21 below:

$$T_1(B_i) = -(5.544613 \cdot 10^{-6})B_i^2 + (4.047152)B_i + 362 \quad (19)$$

$$T_2(B_i) = -(1.529733 \cdot 10^{-6})B_i^2 + (8.750045)B_i + 1136 \quad (20)$$

$$T_3(B_i) = -(3.957050 \cdot 10^{-6})B_i^2 + (18.899622)B_i + 3347 \quad (21)$$

where the background noise level, $B_i$, for frame i is updated each frame as described in equation 22 below.

$$B_i = \min[R_{i-1}(0), 160000, \max[1.00547 B_{i-1}, B_{i-1}+1]] \quad (22)$$

The rate will be eighth if the frame energy is below all three thresholds, quarter if the frame energy is between $T_1(B_i)$ and $T_2(B_i)$, half if the frame energy is between $T_2(B_i)$ and $T_3(B_i)$, and full if the frame energy is above $T_3(B_i)$. Except when the rate is forced by the microprocessor (not shown), through microprocessor interface 8, to a specific rate, the data rate can be raised to any rate but may be lowered by no more than one step per frame (e.g. half rate to quarter rate). In DSP core 4, the coefficients associated with these thresholds are provided in a lookup table in ROM E 114.

A fractional rate algorithm is also provided in the preferred embodiment, allowing the maximum average rate to be limited by the microprocessor (not shown), through microprocessor interface 8. Given a rate limit factor, S, the maximum average rate of the vocoder is limited to $(2S+1)/[2(S+1)]$ by limiting the number of consecutive full rate frames. The functions of block 64 are performed in DSP core 4.

Now proceeding to block 66 of FIG. 3, the bandwidth expanded LPC coefficients are transformed into line spectrum pair (LSP) frequencies (See Soong and Juang, "Line Spectrum Pair (LSP) and Speech Data Compression," ICASSP, 1984). LSP frequencies have been shown to exhibit significantly better properties for transmission and storage and can be encoded more efficiently than LPC coefficients. LSP frequencies representing the ten LPC coefficients are the ten roots of the polynomials shown in equations 23 and 24 below:

$$P'(\omega)=\cos 5(2\pi\omega)+p'_1 \cos 4(2\pi\omega)+ \ldots +p'_4 \cos (2\pi\omega)+0.5p'_5 \quad (23)$$

$$Q'(\omega)=\cos 5(2\pi\omega)+q'_1 \cos 4(2\pi\omega)+ \ldots +q'_4 \cos (2\pi\omega)+0.5p'_5 \quad (24)$$

where $p'_i$ and $q'_i$ for $1 \leq i \leq 5$ are computed in DSP core 4, according to equations 25 through 27 below:

$$p'_0=q'_0=1 \quad (25)$$

$$p'_i=-a_i-a_{11-i}-p'_{i-1} \quad 1\leq i \leq 5 \quad (26)$$

$$q'_i=-a_i+a_{11-i}+q'_{i-1} \quad 1\leq i \leq 5 \quad (27)$$

The roots of $P'(\omega)$ are found by assuming that there is at most one root within each $\pi/32$ radians. $P'(\omega)$ is evaluated at every $\pi/32$ radians from 0 to $\pi$ radians. The existence of a root in any $\pi/32$ interval results in a sign change of the function $P'(\omega)$ over the interval.

If a root is found, a binary search is performed to isolate the root within a region of size $\pi/256$. The binary search involves evaluating $P'(\omega)$ at the center of the current region to determine which half of the region contains the root. The current region is then narrowed to include only the half of the region which was found to contain the root. This process continues until the root is isolated within a region of size $\pi/256$. A linear interpolation is then done to estimate the location of the root within the $\pi/256$ radian region.

The ordering property of LSP frequencies insures that one root of $Q'(\omega)$ exists between each pair of roots of $P'(\omega)$. The fifth root of $Q'(\omega)$ resides between the fifth root of $P'(\omega)$ and $\pi$ radians. The binary search described above is performed between each pair of roots of $P'(\omega)$ and between the fifth root of $P'(\omega)$ and $\pi$ radians to determine the roots of $Q'(\omega)$.

Since the binary search continues until the location of the root is isolated within a region of size $\pi/256$, 256 cosine values equally spaced between 0 and $\pi$, are required. The cosine values are stored in a lookup table in ROM E 114. To find the roots of $P'(\omega)$ and $Q'(\omega)$ a maximum of 48 and 30 function evaluations respectively are required. These function evaluations are the most computationally intensive portion in the conversion of the LPC coefficients to LSP frequencies. The functions of block 66 are performed in DSP core 4.

Now, proceeding to block 68 of FIG. 3, the LSP frequencies are quantized. Each of the LSP frequencies is centered around an associated bias value. Before quantization this bias is subtracted from each associated LSP frequency to reduce the number of bits required for quantization. This bias is computed as shown in equation 28 below.

$$Bias_i=0.5i/(P+1)=(0.\overline{45})i \quad (28)$$

After the bias is subtracted from the LSP frequency, the LSP frequency is quantized using a differential pulse code modulation (DPCM) quantizer. The DPCM quantizer is used because the LSP frequencies vary slowly with time, and quantizing the change in the LSP frequencies reduces the number of bits required for quantization over that which would be required to quantize the LSP frequencies directly.

In DSP core 4, the LSP frequency bias values are stored in a lookup table in ROM E 114. The number of quantization bits used and the quantization step size are functions of which of the 10 LSP frequencies is being quantized and are also functions of the encoding rate. The number of quantization bits, and the step size are stored as a lookup table in ROM E 114 for each LSP frequency at each encoding rate. The lookup table described above is shown in Table II. For example, LSP frequency $\omega_1$ at full rate is quantized using 4 bits and with a step size of 0.025.

TABLE II

| LSP | Full Rate | Half Rate | Quarter Rate | Eighth Rate |
|---|---|---|---|---|
| $\omega_1$ | 4:±0.025 | 2:±0.15 | 1:±0.01 | 1:±0.01 |
| $\omega_2$ | 4:±0.04 | 2:±0.15 | 1:±0.01 | 1:±0.01 |
| $\omega_3$ | 4:±0.07 | 2:±0.03 | 1:±0.01 | 1:±0.01 |
| $\omega_4$ | 4:±0.07 | 2:±0.03 | 1:±0.01 | 1:±0.01 |
| $\omega_5$ | 4:±0.06 | 2:±0.02 | 1:±0.01 | 1:±0.01 |
| $\omega_6$ | 4:±0.06 | 2:±0.02 | 1:±0.01 | 1:±0.01 |
| $\omega_7$ | 4:±0.05 | 2:±0.02 | 1:±0.01 | 1:±0.01 |
| $\omega_8$ | 4:±0.05 | 2:±0.02 | 1:±0.01 | 1:±0.01 |
| $\omega_9$ | 4:±0.04 | 2:±0.02 | 1:±0.01 | 1:±0.01 |
| $\omega_{10}$ | 4:±0.04 | 2:±0.02 | 1:±0.01 | 1:±0.01 |

After quantization and interpolation, a test is performed to ensure that the formant filter will be stable after quantization effects are considered. The LSP frequencies must be separated by at least 80 Hz to insure the stability of the resulting formant filter. If any of the LSP frequencies are separated by less that 80 Hz from an adjacent LSP frequency then bandwidth expansion is again performed. The functions of block 68 are performed in DSP core 4.

Now proceeding to block 70 of FIG. 3, the LSP frequencies are low-pass filtered to reduce quantization effects as shown in equation 29 below:

$$\hat{\omega}_i(current)=SM\hat{\omega}_i(previous)+(1-SM)\omega_i(current) \quad (29)$$

where, in the exemplary embodiment, SM=0 for full rate, SM=0.125 for half rate. For quarter rate and eighth rate, if the consecutive number of quarter or eighth rate frames is less than 10, SM=0.125 and SM=0.9 otherwise.

The LSP frequencies are interpolated for each pitch subframe. The interpolated LSP frequencies for the pitch subframe are used for the corresponding pair of codebook subframes except for eighth rate. The LSP frequencies are interpolated according to equation 30 below:

$$\hat{\omega}'_i(current)=\alpha_\omega \hat{\omega}_i(previous)+(1-\alpha_\omega)\hat{\omega}_i(current) \quad (30)$$

where the weights, $\alpha_\omega$, are stored in a lookup table in ROM E 114 for each pitch subframe and codebook subframe at each rate. The lookup table described above is shown in Table III. For example, $\alpha_\omega$ at full rate is 0.75 for pitch subframe 1 and for codebook subframes 1 and 2.

TABLE III

| Pitch Sub-frame | Codebook Sub-frame | Full Rate | Half Rate | Quarter Rate | Eighth Rate |
|---|---|---|---|---|---|
|   | 1 |   |   |   | $\alpha_{co} = 0.375$ |
| 1 | 1 and 2 | $\alpha_{co} = 0.75$ | $\alpha_{co} = 0.625$ | $\alpha_{co} = 0.375$ |   |
| 2 | 3 and 4 | $\alpha_{co} = 0.50$ | $\alpha_{co} = 0.125$ |   |   |
| 3 | 5 and 6 | $\alpha_{co} = 0.25$ |   |   |   |
| 4 | 7 and 8 | $\alpha_{co} = 1.00$ |   |   |   |

The interpolated LSP frequencies are converted back into LPC coefficients for use in the pitch and codebook searches. The LPC coefficients are computed from $P_A(z)$ and $Q_A(z)$, as shown in equations 31-33 below.

$$A(z)=[P_A(z)+Q_A(z)]/2 \tag{31}$$

where:

$$P_A(z) = (1+z^{-1}) \prod_{j=1}^{5} [1 - 2z^{-1}\cos(2\pi\omega_{2j-1}) + z^{-2}] \tag{32}$$

$$Q_A(z) = (1-z^{-1}) \prod_{j=1}^{5} [1 - 2z^{-1}\cos(2\pi\omega_{2j}) + x^{-2}] \tag{33}$$

In the exemplary embodiment, a Taylor series expansion is evaluated within DSP core 4 to compute the cosine values in $P_A(z)$ and $Q_A(z)$. Taylor series expansion provides more accurate cosine values than those used in the root search described previously. The values of $P_A(z)$ and $Q_A(z)$ are computed in DSP core 4 by performing the convolution of the quadratic polynomials as shown in equations 32-33 above. The functions of block 70 are performed in DSP core 4.

Now proceeding to block 72 of FIG. 3, a comprehensive analysis by synthesis pitch search operation is performed. This exhaustive search procedure is illustrated by the loop formed by blocks 72-74. Pitch prediction is done, in the exemplary embodiment, on pitch subframes in all but eighth rate. The pitch encoder illustrated in FIG. 7 uses an analysis by synthesis method to determine the pitch prediction parameters (i.e. the pitch lag, L, and the pitch gain, b). The parameters selected are those that minimize the MSE between the perceptually weighted input speech and the synthesized speech generated using those pitch prediction parameters.

Figure 7:
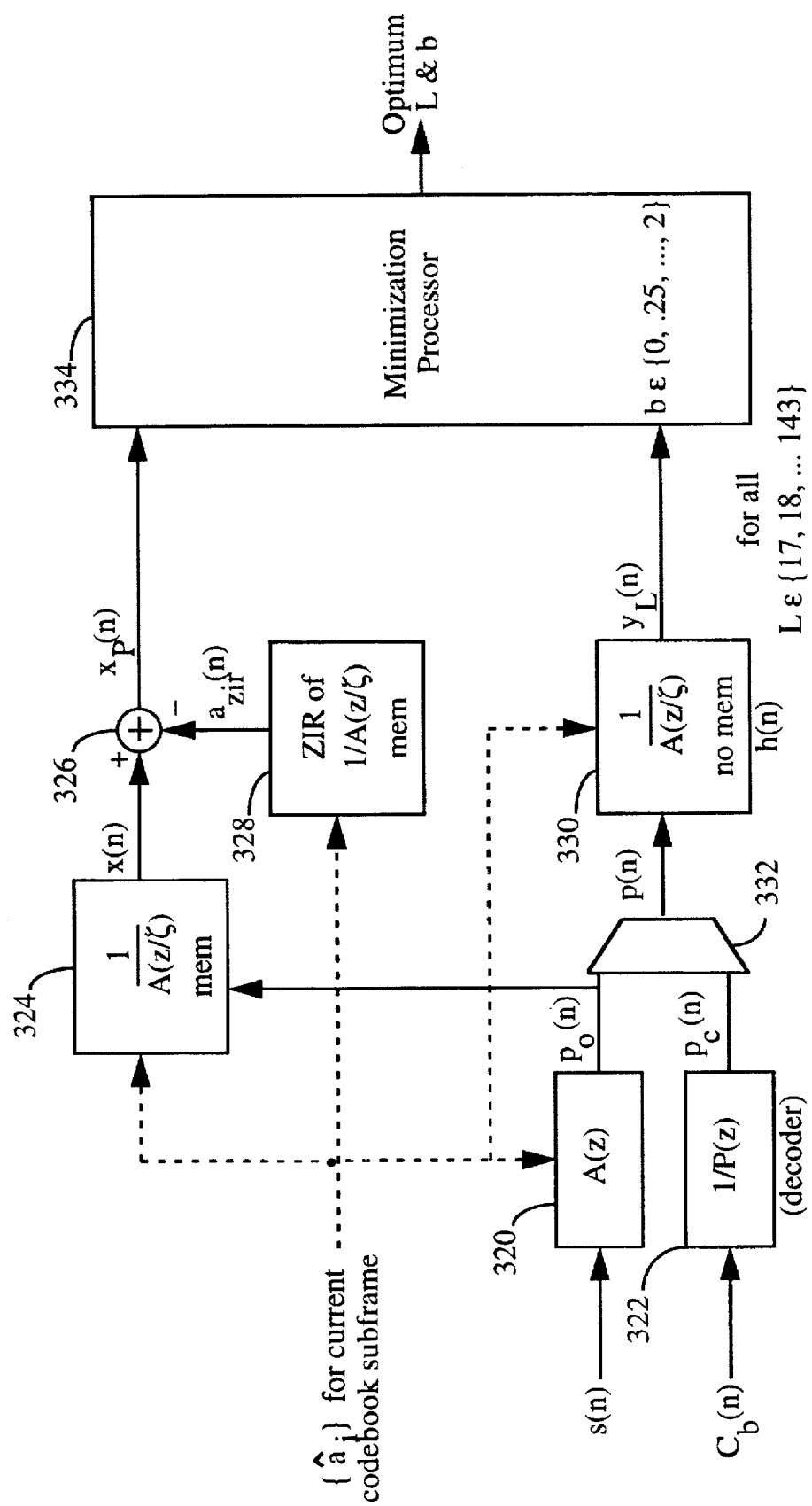
FIG. 7 is an illustration of the pitch search operation as performed in the exemplary embodiment of the present invention.

In the preferred embodiment of the present invention, implicit perceptual weighting is used in the extraction of the pitch prediction parameters as illustrated in FIG. 7. In FIG. 7, the perceptual weighting filter with response shown in equation 34 below:

$$W(z) = \frac{A(z)}{A(z/\zeta)} \tag{34}$$

is implemented as a cascade of filter 320 and filter 324. The implicit perceptual weighting reduces the computational complexity of the perceptual weighting filtering by reusing the output of filter 320 as the open loop formant residual. This operation of splitting the filter of equation 34 into two parts eliminates one filter operation in the pitch search.

The input speech samples, s(n), are passed through formant prediction filter 320 whose coefficients are the LPC coefficients resulting from the LSP interpolation and LSP to LPC conversion of block 70 of FIG. 3, described previously herein. The output of formant prediction filter 320 is the open loop formant residual, $p_O(n)$. The open loop formant residual, $p_O(n)$, is passed through weighted formant synthesis filter 324 with transfer function shown in equation 35 below.

$$H(z) = \frac{1}{A(z/\zeta)} = \frac{1}{1 - \sum_{i=1}^{10} a_i(z/\zeta)^{-i}}, \text{ where } \zeta = 0.8. \tag{35}$$

The output of weighted formant synthesis filter 324 is the perceptually weighted speech, x(n). The effect of the initial filter state or filter memory of weighted formant synthesis filter 324 is removed by subtracting the zero input response (ZIR) of weighted formant synthesis filter 324 from the output of weighted formant synthesis filter 324. The computation of the ZIR of weighted formant synthesis filter 324 is computed in ZIR element 328. The ZIR, $a_{ZIR}(n)$, is subtracted from the perceptually weighted speech, x(n), in summer 326. At the start of each pitch subframe the filter memories of ZIR element 328 and of weighted formant synthesis filter 324 are identical.

In the pitch search, zero contribution from the codebook vector is assumed for the current subframe in the computation of the open loop formant residual. The pitch search is performed using both the open loop formant residual, $p_O(n)$, described previously, and the closed loop formant residual, $p_c(n)$. The closed loop formant residual, $p_c(n)$, are the samples reconstructed in pitch synthesis filter 322 during the previous pitch subframes. The transfer function of pitch synthesis filter 322 is shown in equation 36 below:

$$\frac{1}{P(z)} = \frac{1}{(1-bz^{-L})} \tag{36}$$

where the pitch lag, L, and the pitch gain, b, are computed during the pitch search procedures for the previous pitch subframes. The input to pitch synthesis filter 322, is the excitation vector, $C_b(n)$, generated by multiplying the codebook entry $C_b(I)$, for index I, and the codebook gain, G, computed during the codebook search procedures for the previous codebook subframes. The formant residual thus generated is called the closed loop formant residual.

In the exemplary embodiment, $p_c(n)$ consists of 143 closed loop reconstructed samples. The search moves from a largely open loop search to a largely closed loop search for a window the length of the pitch subframe. For a pitch subframe of length $L_p$, n varies between $-L_{MAX}=-143$ and $L_p-17$. In the exemplary embodiment, $L_p=40$ for full rate, $L_p=80$ for half rate, and $L_p=160$ for quarter rate. In the exemplary embodiment, the samples $p_c(n)$ and $p_O(n)$ are stored contiguously as illustrated by multiplexer 332, allowing the $p_c(n)$ and $p_O(n)$ values to be accessed sequentially as a single block of samples of length $L_p+143$. The samples are stored in RAM B 122.

The formant residual, p(n), is comprised of $p_c(n)$ and $p_O(n)$ and is passed through weighted formant synthesis filter 330 having a transfer function shown in equation 37 below.

$$H(z) = \frac{1}{A(z/\zeta)}, \text{ where } \zeta = 0.8 \tag{37}$$

Weighted formant synthesis filter 330 is used to generate a sequence of $L_p$ weighted synthesized speech samples, $y_L(n)$, for each value of pitch lag, L. The weighted synthesized speech sequence, $y_L(n)$, and the weighted speech sequence, $x_p(n)$ are provided to minimization processor 334. Since the effects of the initial state of the weighted formant synthesis filter 324 have been subtracted out, only the impulse response of weighted formant synthesis filter 330 must be computed. Computation of $y_L(n)$ entails convolving the impulse response, h(n), of weighted formant synthesis filter 330 with the appropriate subsequence within p(n), to obtain the weighted synthesized speech samples, $y_L(n)$, for pitch lag L.

The convolution is performed in a recursive manner in DSP core 4 as illustrated in FIGS. 5a–d. A set of $y_L(n)$ values is computed for each pitch lag value, from L=17 to L=143. The impulse response, h(n), of weighted formant synthesis filter 330 is truncated to the first twenty samples in the exemplary embodiment and stored in RAM A 104. The formant residual, p(n), is stored in RAM B 122. The convolution for the first pitch lag, L=17, is performed in a non-recursive manner as shown in equation 38 below:

$$y_{17}(n) = h(n)*p_{17}(n) = \sum_{i=0}^{19} h(i)p_{17}(n-i), 0 \leq n < L_p \quad (38)$$

where $L_p$ is the pitch subframe length.

The first sequence, $y_{17}(n)$, is computed and stored in RAM C 142. Subsequent sequences, $y_L(n)$, for the pitch lags, L=18 through L=143, are computed recursively as shown in equations 39–41 below.

$$y_L(n) = h(0)p(-L) \ n=0 \quad (39)$$

$$y_L(n) = y_{L-1}(n-1) + h(n)p(-L) \ 1 \leq n < 20, \ 17 < L \leq 143 \quad (40)$$

$$y_L(n) = y_{L-1}(n-1) \ 20 \leq n < L_p \quad (41)$$

Note the relationship shown in equation 42 below.

$$p_L(n) = p(n-L) = p_{L-1}(n-1), \ 17 < L \leq 143, \ 0 \leq n < L_p \quad (42)$$

The efficiency of the recursive convolution is optimized by dividing the RAMs into three partitions, each with a dedicated addressing unit to control load and store operations. This is referred to as triple-partitioned RAM. Computing the convolution values in equation 40, and producing a result each clock cycle is then possible. For example, in a single clock cycle, $y_{18}(10)$ is calculated, $y_{18}(9)$ is stored, $y_{17}(10)$ is fetched, and h(10) is fetched. Thus, equation 40 above can produce a result each cycle. Producing a result each cycle for equation 41 above is also possible. For example, in a single cycle, $y_{18}(24)$ is computed, $y_{17}(24)$ is fetched, and $y_{18}(23)$ is stored.

The ability to perform equations 40 and 41 without the need to move the previously calculated weighted synthesized speech samples $y_{L-1}(n-1)$ to the same source RAM between each pitch lag update requires a storage strategy and hardware capability referred to as ping-ponging in which the source and destination RAMs are swapped between each lag update. When computing $y_L(n)$ for even pitch lag values, $y_{L-1}A(n-1)$ values are fetched from a first of three RAMs and results are stored in a second of three RAMs. When computing $y_L(n)$ for odd pitch lag values, $y_{L-1}(n-1)$ values are fetched from a second of three RAMs and results are stored in a first of three RAMs. This ping-ponging eliminates the need to move the newly computed $y_L(n)$ values to, and the previously calculated $y_{L-1}(n-1)$ values from, the same RAM between each pitch lag update.

Figure 8:
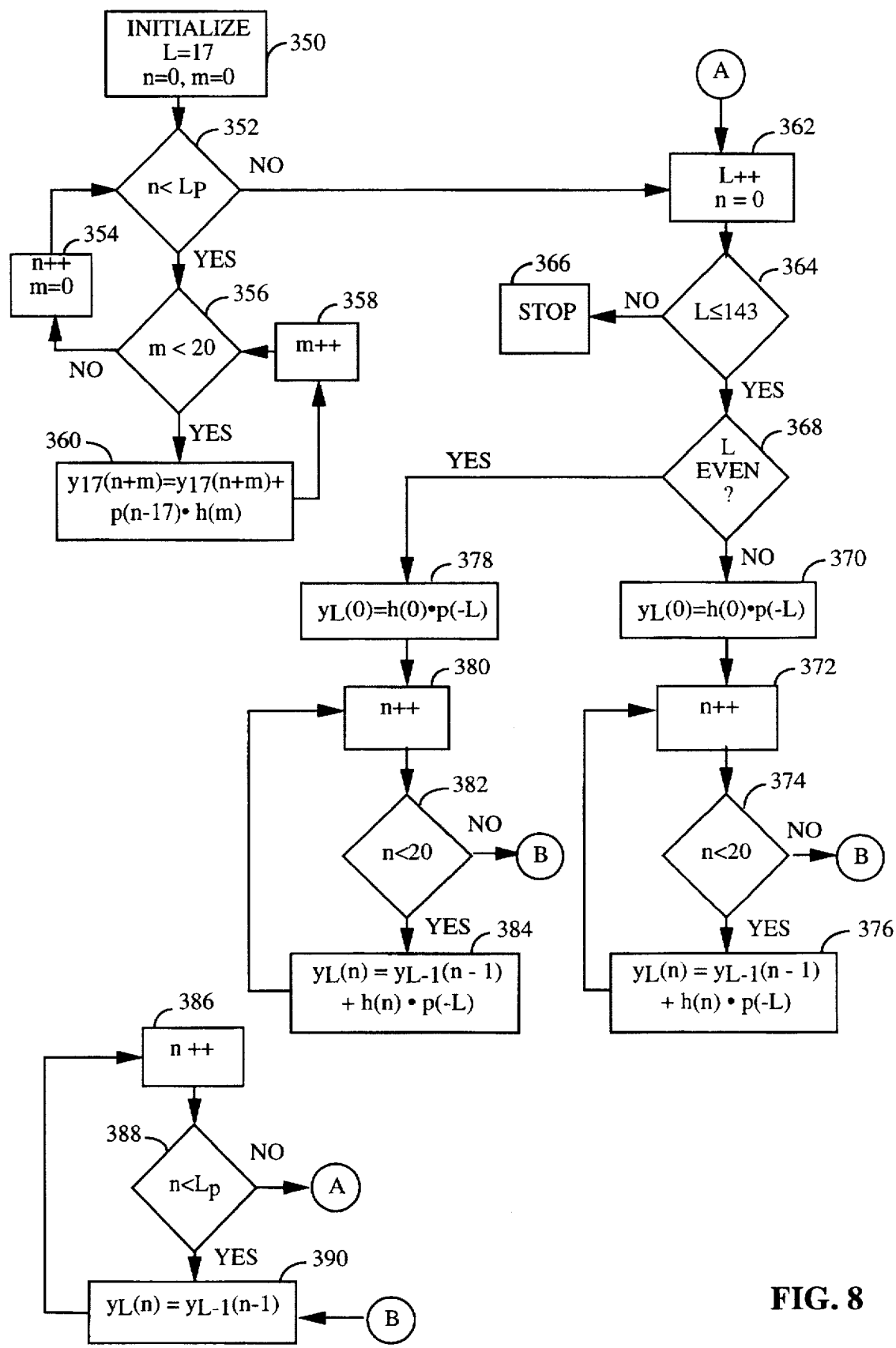
FIG. 8 is a flowchart of the pitch search operation of the exemplary embodiment of the present invention.

FIG. 8 is a flow diagram for the execution of the convolution portion (both initial non-recursive and recursive convolutions) of the pitch search in the exemplary embodiment. In block 350, the pitch lag, L, is initialized to its lowest value which, in the exemplary embodiment, is 17. The sample number, n, and the filter index, m, are set to zero, and the values of $y_{17}(n)$ are set to zero. Blocks 352 through 360 form the initial convolution loop which is computed in a non-recursive manner. The computation of the initial convolution, where L=17, is performed in accordance with equation 43 below.

$$y_{17}(n) = \sum_{i=0}^{19} h(i)p_{17}(n-i), 0 \leq n < L_p \quad (43)$$

The computation of the initial convolution uses fixed length loops to reduce computational complexity. In this manner, the overhead required to set up a variable length loop structure within the inner loop (blocks 356–360) of equation 43 is avoided. Each $y_{17}(n)$ value is sent to minimization processor 334 after it is computed.

Block 352 tests the sample index, n. If n is equal to the pitch subframe length, $L_p$, then the initial convolution is complete and flow continues to block 362. If, in block 352, n is less than the pitch subframe length, then flow continues to block 356. Block 356 tests index, m. If m is equal to the filter impulse response length, 20, in the exemplary embodiment, then the current iteration is complete and flow continues to block 354 where m is set to 0 and n is incremented. Flow then returns to block 352. If, in block 356, m is less than the impulse response length, then flow continues to block 360 where the partial sums are accumulated. Flow continues to block 358 where the index, m, is incremented and the flow proceeds to block 356.

The operations involved in the initial convolution loop formed by blocks 352 through 360 are performed in DSP core 4, where appropriate pipelining is provided, to allow the accumulation of products, as shown in block 360, each clock cycle. The following operations illustrate the pipelining of the computations and occur in DSP core 4 in a single clock cycle. The filter response value, h(m+1), is fetched from RAM A 104 and provided to AREG 130. The formant residual value, p(n−17), is fetched from RAM B 122 and provided to BREG 134. The partial sum, $y_{17}(n+m-1)$, residing in COREG 164 is provided to RAM C 182 through multiplexers 168 and 180. The partial sum $y_{17}(n+m+1)$, is provided by RAM C 182 to DREG 156 through multiplexer 158. The values, h(m) and p(n−17), in AREG 130 and BREG 134 respectively are provided to multiplier 132. The output of multiplier 132 is provided through multiplexer 138 to barrel shifter 140, which normalizes the value in accordance with a scaling value provided by SREG 136 through multiplexer 149. The value in SREG 136 is the value needed to normalize the p(n−17) sequence. Applying this normalization factor to the product of p(n−17) and h(m) achieves the same effect as normalizing p(n−17) because full precision of the product is maintained before the normalization takes place in barrel shifter 140. The normalized value is provided to a first input of summer 146. The partial sum, $y_{17}(n+m)$, is provided by DREG 156 through multiplexer 154, disabled inverter 152 and barrel shifter 150, to a second input of summer 146. The output of summer 146 is provided through multiplexer 148 to COREG 164. When index, n, reaches its maximum allowable value in block 352, the initial convolution is complete and the partial sums present in RAM C 182 are now the final result of the convolution.

When the initial convolution is complete, flow continues to block 362 where recursive convolution is performed in the calculations for the remaining pitch lag values.

In block 362, the sample index, n, is set to zero and the pitch lag index, L, is incremented. Flow continues to block 364. Block 364 tests L. If L is greater than the maximum pitch lag value, 143 in the exemplary embodiment, then flow continues to block 366, where the pitch search operation terminates. If the L is less than or equal to 143 then flow continues to block 368. Block 368 controls the ping-ponging operation described previously. In block 368, L is tested to determine if it is even or odd. If L is even, then flow continues to block 378 (operation described as Case I). If L is odd, then flow continues to block 370 (operation described as Case II).

Case I: (Even Values of Pitch Lag, L)

In block 378, $y_L(0)$ is computed in accordance with equation 39. Address unit A 102 provides an address value to RAM A 104, which in response provides h(0) through multiplexer 108 to AREG 130. In the same clock cycle, address unit B 120 provides an address value to RAM B 122, which in response provides p(-L) through multiplexer 116 to BREG 134. During the next clock cycle AREG 130 provides h(0) and BREG 134 provides p(-L) to multiplier 132, where the two values are multiplied and the product is provided through multiplexer 138 to barrel shifter 140. Barrel shifter 140, in accordance with the value provided by SREG 136, through multiplexer 149, normalizes the product and provides the normalized product to a first input of summer 146. The second input of summer 146 is provided with zero through multiplexer 154, disabled inverter element 152, and barrel shifter 152. The output of summer 146 is provided to COREG 164 through multiplexer 148. During the same clock cycle, $y_{L-1}(0)$ and h(1) are fetched from RAM B 122 and RAM A 104 and provided to DREG 156 and AREG 130, through multiplexers 158 and 108, respectively. In block 380, the synthesized speech sample index, n, is incremented. In control block 382, if the synthesized speech sample index, n, is less than 20, then flow proceeds to block 384.

In block 384 a new $y_L(n)$ value is computed each clock cycle in accordance with equation 40. Appropriate setup, required prior to the first iteration of block 384 in order to initialize the values of $y_{L-1}(n-1)$ and h(n) was achieved in block 378 as described above. Appropriate cleanup is also required subsequent to the last iteration of block 384 in order to store the final value of $y_L(19)$.

In the first iteration of block 384, $y_L(0)$, computed in block 378, is present in COREG 164. COREG 164 provides $y_L(0)$ through multiplexers 168 and 180 to RAM C 182 for storage, with address value provided to RAM C 182 from address unit C 186. $y_L(0)$ is provided to minimization processor 334 at the same time it is provided to RAM C 182.

In block 384 the following operations are performed in a single clock cycle. The $y_{L-1}(n)$ value is provided by RAM B 122, in accordance with an address provided by address unit B 120, through multiplexers 116 and 158 to DREG 156. The impulse response value, h(n+1), is provided by RAM A 104, in accordance with an address provided by address unit A 102, through multiplexer 108 to AREG 130. DREG 156 provides $y_{L-1}(n-1)$ through multiplexer 154, disabled inverter element 152, and barrel shifter 150, to a first input of summer 146. AREG 130 provides h(n) and BREG 134 provides p(-L) to multiplier 132, where the two values are multiplied and the product is provided by multiplier 132 through multiplexer 138 to barrel shifter 140. Barrel shifter 140 in accordance with a value provided by SREG 136, normalizes the product value and provides the normalized product value to a second input of summer 146. The output of summer 146 is provided through multiplexer 148 to COREG 164. The value in COREG 164, computed in the previous iteration, is provided through multiplexers 168 and 180 to RAM C 182 for storage and to minimization processor 334.

In block 380, the synthesized speech sample index, n, is incremented. In control block 382, if the synthesized speech sample index, n, is equal to 20, then $y_L(19)$, computed in the final iteration, is provided through multiplexers 168 and 124 to RAM B 122, for storage in a circular buffer and to minimization processor 334, before flow proceeds to block 390.

End of Case I

Case II: (Odd Values of Pitch Lag, L)

In block 370, $y_L(0)$ is computed in accordance with equation 39. Address unit A 102 provides an address value to RAM A 104, which in response provides h(0) through multiplexer 108 to AREG 130. In the same clock cycle address unit B 120 provides an address value to RAM B 122, which in response provides p(-L) through multiplexer 116 to BREG 134. During the next clock cycle AREG 130 provides h(0) and BREG 134 provides p(-L) to multiplier 132, where the two values are multiplied and the product is provided through multiplexer 138 to barrel shifter 140. Barrel shifter 140, in accordance with the value provided by SREG 136, through multiplexer 149, normalizes the product and provides the normalized product to a first input of summer 146. The second input of summer 146 is provided with zero through multiplexer 154, disabled inverter element 152, and barrel shifter 152. The output of summer 146 is provided to COREG 164 through multiplexer 148. During the same clock cycle $y_{L-1}(0)$ and h(1) are fetched from RAM C 182 and RAM A 104 and provided to DREG 156 and AREG 130 through multiplexers 158 and 108 respectively.

In block 372, the synthesized speech sample index, n, is incremented. In control block 374, if the synthesized speech sample index, n, is less than 20, then flow proceeds to block 376.

In block 376, a new $y_L(n)$ value is computed each clock cycle in accordance with equation 40. Appropriate setup, required prior to the first iteration of block 376 in order to initialize the values of $y_{L-1}(n-1)$ and h(n) was achieved in block 370 as described above. Appropriate cleanup is also required subsequent to the last iteration of block 376 in order to store the final value of $y_L(19)$.

In the first iteration of block 376, $y_L(0)$, computed in block 370, is present in COREG 164. COREG 164 provides $y_L(0)$ through multiplexers 168 and 180 to RAM B 122 for storage, with address value provided to RAM B 122 from address unit B 120. $y_L(0)$ is provided to minimization processor 334 at the same time it is provided to RAM B 122.

In block 376, the following operations are performed in a single cycle. The $y_{L-1}(n)$ value is provided by RAM C 182, in accordance with an address provided by address unit C 186, through multiplexer 158 to DREG 156. The impulse response value, h(n+1), is provided by RAM A 104, in accordance with an address provided by address unit A 102, through multiplexer 108 to AREG 130. DREG 156 provides $y_{L-1}(n-1)$, through multiplexer 154, disabled inverter element 152, and barrel shifter 150, to a first input of summer 146. AREG 130 provides h(n) and BREG 134 provides p(-L) to multiplier 132, where the two values are multiplied and the product is provided by multiplier 132 through multiplexer 138 to barrel shifter 140. Barrel shifter 140 in accordance with a value provided by SREG 136, normalizes the product value and provides the normalized product value to a second input of summer 146. The output of summer 146 is provided through multiplexer 148 to COREG 164. The value in COREG 164, computed in the previous iteration, is provided through multiplexers 168 and 124 to RAM B 122 for storage and to minimization processor 334.

In block 372, the synthesized speech sample index, n, is incremented. In control block 374, if the synthesized speech sample index, n, is equal to 20, then $y_L(19)$, computed in the final iteration, is provided through multiplexers 168 and 124 to RAM B 122 for storage in a circular buffer within RAM B 122 and to minimization processor 334, before flow proceeds to block 390.

End of Case II

Prior to the first iteration of block 390, $y_{L-1}(19)$ is fetched from the circular buffer in RAM B 122 and loaded into BREG 134. $y_{L-1}(19)$ is then moved from BREG 134 to COREG 164, after which $y_{L-1}(20)$ is fetched from the circular buffer in RAM B 122 and loaded into BREG 134.

In block 390, a new $y_L(n)$ is computed each clock cycle in accordance with equation 41. The following operations are performed in a single clock cycle. $y_{L-1}(n-2)$ is provided by BREG 134 to COREG 164. $y_{L-1}(n-3)$ is fetched from the circular buffer in RAM B 122 and loaded into BREG 134. $y_{L-1}(n-1)$ present in COREG 164 is presented to minimization processor 334. Following the last iteration of block 390, $y_{L-1}(L_p-2)$ is deleted from the circular buffer in RAM B 122. By adding an element to the circular buffer each pitch lag and deleting an element from the circular buffer each pitch lag, the size of the circular buffer is maintained at $L_p-19$.

The implementation of the circular buffer is accomplished through special address registers in address unit B 120, which dictate the wrap around points so that a sequential memory can be addressed automatically in a circular fashion.

In block 386, the synthesized speech sample index, n, is incremented. In control block 388, if the synthesized speech sample index, n, is less than $L_p$, then flow proceeds again to block 390. If the synthesized speech sample index, n, is equal to $L_p$, then all $y_L(n)$ values have been computed for the current pitch lag value, L, and flow returns to block 362.

Prior to the calculation of the synthesized speech samples, $y_L(n)$, a sequence of length $L_p$ of perceptually weighted speech samples, $x_p(n)$, are provided to minimization processor 334. As described previously, sequences of synthesized speech samples, $y_L(n)$, of length $L_p$ for lag values L=17 through L=143 are provided to minimization processor 334 during the initial and recursive convolution calculations. The synthesized speech samples are provided sequentially to minimization processor 334. Minimization processor 334 calculates the autocorrelation of each synthesized speech sample sequence, $y_L(n)$, and the cross-correlation between each synthesized speech sample sequence, $y_L(n)$, and the sequence of perceptually weighted speech samples, $x_p(n)$. From these correlation values, minimization processor 334 then calculates a relative measure of the MSE between each synthesized speech sample sequence, $y_L(n)$, and the sequence of perceptually weighted speech samples, $x_p(n)$. For each pitch lag, L, the MSE is calculated for all possible pitch gain values, b, of the synthesized speech sample sequence. Minimization processor 334 finds the minimum MSE over all pitch lag values, L, and all possible pitch gain values, b, by maintaining the value of the minimum MSE through the current pitch lag, L, and the current pitch gain, b. The pitch lag estimate, $\hat{L}$, and pitch gain estimate index, $\hat{b}$, corresponding to the minimum MSE are also maintained by minimization processor 334. Each new MSE value is compared to the minimum MSE maintained in minimization processor 334. If the new MSE is less than the minimum MSE, then the minimum MSE is replaced by the new MSE value and the pitch lag estimate, $\hat{L}$, and the pitch gain estimate index, $\hat{b}$, are updated to reflect the new minimum MSE. The minimum MSE and corresponding pitch lag estimate, $\hat{L}$, and pitch gain estimate index, $\hat{b}$, maintained in minimization processor 334 are initialized each pitch subframe using the first negative MSE value calculated during the pitch subframe. After all pitch lag values, L, and all pitch gain values, b, are exhausted, the pitch lag estimate, $\hat{L}$, and the pitch gain estimate index, $\hat{b}$, will be the optimal pitch lag index and the optimal pitch gain index respectively for the current pitch subframe. Minimization processor 334 provides the optimal pitch lag, $\hat{L}$, and the optimal pitch gain index, $\hat{b}$, to DSP core 4. The optimal pitch lag, $\hat{L}$, and the optimal pitch gain index, $\hat{b}$, are those that result in the minimum MSE between the perceptually weighted speech samples, $x_p(n)$, and the weighted synthesized speech samples, $y_L(n)$. The MSE is a function of pitch lag, L, and pitch gain, b, as described by equations 44 through 46 below:

$$MSE(L,b) = \sum_{n=0}^{L_p-1} (x_p(n) - by_L(n))^2 \qquad (44)$$

$$= \sum_{n=0}^{L_p-1} (x_p(n))^2 - 2b \sum_{n=0}^{L_p-1} (x_p(n)y_L(n)) + b^2 \sum_{n=0}^{L_p-1} (y_L(n))^2 \qquad (45)$$

$$= Ex_p x_p - 2bEx_p y_L + b^2 Ey_L y_L \qquad (46)$$

$Ex_p x_p$ is the autocorrelation of the perceptually weighted speech samples, $x_p(n)$. $Ex_p y_L$ is the cross-correlation between the perceptually weighted speech samples, $x_p(n)$, and the weighted synthesized speech samples, $y_L(n)$. $Ey_L y_L$ is the autocorrelation of the weighted synthesized speech samples, $y_L(n)$.

The autocorrelation, $Ex_p x_p$, of the perceptually weighted speech samples, $x_p(n)$, is not a function of pitch gain, b. $Ex_p x_p$ remains constant during each pitch subframe and therefore does not influence the selection of the optimal pitch lag and the optimal pitch gain. Minimization of equations 44 through 46 over pitch lag, L, and pitch gain, b, is equivalent to minimization of equation 47 below:

$$MSE(L,b) = -2bEx_p y_L + b^2 Ey_L y_L \qquad (47)$$

Minimization processor 334 computes the autocorrelations, $Ey_L y_L$, of the weighted synthesized speech sample sequences, $y_L(n)$, and the cross-correlations, $Ex_p y_L$, between the perceptually weighted speech sample sequence, $x_p(n)$, and the weighted synthesized speech sample sequences, $y_L(n)$. For each correlation pair, ($Ex_p y_L$, $Ey_L y_L$), minimization processor 334 computes the relative MSE, according to equation 47 above, for a set of values of pitch gain, b. The calculation of the correlations $Ex_p y_L$ and $Ey_L y_L$ are performed simultaneously in minimization processor 334. The relative MSE values are calculated and the decisions regarding MSE minimization are made for pitch lag L while the correlation values are being calculated for pitch lag L+1.

FIGS. 6a and 6b illustrate an exemplary embodiment of minimization processor 334. The perceptually weighted speech samples, $x_p(n)$, are provided by DSP core 4 to latch 210 for storage in RAM X 212, in accordance with an address provided by control 220. Scaled pitch gain values, −2b, for b=0.25 through b=2.0 in steps of 0.25, are provided through multiplexer 260 by DSP core 4, for storage in latches 264, 268, 272, 276, 280, 284, 288, and 292 respectively. Corresponding scaled pitch gain values, $b^2$, are provided through multiplexer 260 by DSP core 4, for storage in latches 262, 266, 270, 274, 278, 282, 286, and 290 respectively. Multiplexer 260 provides values directly to latch 262. Latch 262 provides values directly to latch 264. Latch 276 provides values to latch 278 through multiplexer 294. Latch 290 provides values directly to latch 292 and so on. Shifting values through latches 262 through 292 and through multiplexer 294 allows values to be provided through multiplexer 260 to all latches within circular buffer 259. Following the storage of the perceptually weighted speech samples, $x_p(n)$, and the storage of the $-2b$ and $b^2$ values, sequences of weighted synthesized speech samples, $y_L(n)$, are provided to latch 210. The weighted synthesized speech samples, $y_L(n)$, are provided by latch 210 to the two inputs of multiplier 216, which produces the squares, $(y_L(n))^2$, of the weighted synthesized speech samples. Latch 210 also provides the weighted synthesized speech samples, $y_L(n)$, to a first input of multiplier 218. RAM X 212 provides the perceptually weighted speech samples, $x_p(n)$, through latch 214, to a second input of multiplier 218. Multiplier 218 computes the product values, $x_p(n)y_L(n)$. A new square, $(y_L(n))^2$, and a new product, $x_p(n)y_L n)$, are computed each cycle by multipliers 216 and 218 respectively. The sample index, n, varies from 0 through $L_p-1$ for each pitch lag, L.

The squares, $(y_L(n))^2$, of the weighted synthesized speech samples are provided to accumulator 221. The product values, $x_p(n)y_L(n)$, are provided to accumulator 231. Accumulator 221 computes the sum of the $L_p$ squares for each pitch lag, L. Accumulator 231 computes the sum of the $L_p$ product values for each pitch lag, L.

Before each new pitch lag, latch 226 is provided with zero through multiplexer 224. Accumulator 221, is then ready to compute the autocorrelation, $Ey_L y_L$, for the current pitch lag, L. In accumulator 221, the squares, $(y_L(n))^2$, are provided to a first input of summer 222. A running total is provided by latch 226 to a second input of summer 222. The newly computed running total is provided by summer 222, through multiplexer 224, to latch 226 for storage. After the accumulation over all $L_p$ values for pitch lag L, the autocorrelation, $Ey_L y_L$, is provided to latch 228 for storage.

Before each new pitch lag, latch 236 is provided with zero through multiplexer 234. Accumulator 231, is then ready to compute the cross-correlation, $Ex_p y_L$, for the current pitch lag, L. In accumulator 231, the product values, $x_p(n)y_L(n)$, are provided to a first input of summer 232. A running total is provided by latch 236 to a second input of summer 232. The newly computed running total is provided by summer 232, through multiplexer 234, to latch 236 for storage. After the accumulation over all $L_p$ values for pitch lag L, the cross-correlation, $Ex_p y_L$, is provided to latch 238 for storage.

The MSE described by equation 47 is then computed in the two cycle process described below.

In a first of two cycles, latch 238 provides the cross-correlation, $Ex_p y_L$, between the perceptually weighted speech samples and the weighted synthesized speech samples through multiplexer 230 to a first input of multiplier 240. Circular buffer 259 provides the scaled pitch gain value, $-2b$, to a second input of multiplier 240 through multiplexer 296. The product, $-2bEx_p y_L$, is provided by multiplier 240 to a first input of summer 242. The second input of summer 242 is provided with zero though multiplexer 246. The output of summer 242 is provided to latch 244 for storage. The values in latches 262 through 292 of circular buffer 259 are rotated by providing the output of latch 276 to latch 278 through multiplexer 294 and by providing the output of latch 292 to latch 262 through multiplexer 260. After this rotation, latches 262, 264, 266, 268, 270, 272, 274, 276, 278, 280, 282, 284, 286, 288, 290 and 292 contain the values previously contained in latches 292, 262, 264, 266, 268, 270, 272, 274, 276, 278, 280, 282, 284, 286, 288, 290 respectively. In the pitch search a circular buffer is comprised of latches 262 through 292 and multiplexers 260 and 294 of circular buffer 259. By rotating the values in circular buffer 259, latch 292 provides $-2b$ and $b^2$ in the first and the second cycles respectively.

In a second of two cycles latch 228 provides the autocorrelation, $Ey_L y_L$, of the weighted synthesized speech samples through multiplexer 230 to a first input of multiplier 240. Circular buffer 259 provides the scaled pitch gain value, $b^2$, to a second input of multiplier 240 through multiplexer 296. The product, $b^2 Ey_L y_L$, is provided by multiplier 240 to a first input of summer 242. The second input of summer 242 is provided with the output of latch 244, $-2bEx_p y_L$, through multiplexer 246. Summer 242 provides $-2bEx_p y_L + b^2 Ey_L y_L$ to latch 244 for storage. The values in latches 262 through 292 of circular buffer 259 are then rotated as described above.

The two cycle process described above is repeated for all eight pairs, ($-2b$, $b^2$), of scaled pitch gain values. During the two cycles following the calculation of the current MSE value, $-2bEx_p y_L + b^2 Ey_L y_L$, a new MSE value is being computed using a new pair of $-2b$ and $b^2$ values. Before latch 244 is updated with the new MSE value, the current MSE value is compared to the current minimum MSE, stored in latch 250, for the current pitch subframe. The current MSE value, $-2bEx_p y_L + b^2 Ey_L y_L$, is provided by latch 244 to the positive input of subtractor 248. Latch 250 provides the current minimum MSE value to the negative input of subtractor 248. Control 220 monitors the result of the difference output from subtractor 248. If the difference is negative, the current MSE value is a new minimum MSE for the current pitch subframe and is stored in latch 250, and the corresponding pitch lag estimate, $\hat{L}$, and pitch gain estimate index, $\hat{b}$, are updated in control 220. If the difference is non-negative, the current MSE value is ignored.

Before each pitch subframe, DSP core 4 issues a command to minimization processor 334 informing control 220 that a new pitch subframe will follow. Upon receiving this command the current pitch lag and the current pitch gain index are set to 0 in control 220. Before each new sequence of weighted synthesized speech samples are provided to minimization processor 334, DSP core 4 issues a command to minimization processor 334, informing control 220 that a new sequence of weighted synthesized speech samples will follow. Upon receiving this command, control 220 increments the current pitch lag and the current pitch gain index by 1, corresponding to a pitch lag increment of 1 and a pitch gain increment of 0.25. While the first sequence of weighted synthesized speech samples are being provided to minimization processor 334, the current pitch lag and the current pitch gain index will equal 1 corresponding to a pitch lag of L=17, and a normalized pitch gain of b=0.25. Also before each pitch subframe, the current pitch lag estimate, $\hat{L}$, and the current pitch gain estimate index, $\hat{b}$, are set to zero, indicating an invalid pitch lag and pitch gain. During each pitch subframe, control 220 will detect the first negative MSE in latch 244. This value is stored in latch 250, and the corresponding pitch lag estimate, $\hat{L}$, and pitch gain estimate index, $\hat{b}$, are updated in control 220. This is done in order to initialize the minimum MSE in latch 250 each pitch subframe. Should no negative MSE value be produced during the pitch subframe, the pitch lag estimate, $\hat{L}$, and the pitch gain estimate index, $\hat{b}$, will be zero at the end of the subframe. These estimates will be provided by control 220 to DSP core 4. If DSP core 4 receives an invalid pitch lag estimate, the optimal pitch gain is set to zero, b=0, corresponding to zero MSE. With the pitch gain of the pitch filter set to zero, the pitch lag is of no consequence. If DSP core 4 receives a valid pitch lag estimate, $\hat{L}$, then this value is used as the optimal pitch lag, and the optimal pitch gain used will be 0.25, 0.5, 0.75, 1.0, 1.25, 1.5, 1.75 and 2.0 for pitch gain estimate indices of 1 through 8 respectively.

In the pitch search, the nature of the MSE function, MSE(L,b), of equation 47 allows computational savings to be achieved. The remaining MSE calculations of the current pitch lag may be aborted when it is determined that the remaining MSE values, yet to be computed within the current pitch lag, can not result in an MSE value which is less than the current minimum MSE stored in latch 250. In the exemplary embodiment, three techniques for computational savings in the pitch search are employed in minimization processor 334. The MSE functions, MSE(L,b), are quadratic in b. One quadratic equation is formed for each pitch lag value, L. All of these quadratic equations pass through the origin, b=0 and MSE(L,b)=0. The pitch gain value b=0 is included in the set of possible gain values, although it is not explicitly searched for in the pitch search operation.

The first computational savings method involves aborting the calculation of the MSE values in the pitch search procedure of the current pitch lag when $Ex_p y_L$ is negative. All pitch gain values are positive, insuring that zero is an upper bound on the minimum MSE for each subframe. A negative value of $Ex_p y_L$ would result in a positive MSE value and would therefore be sub-optimal.

The second computational savings method involves aborting the calculation of the remaining MSE values in the pitch search procedure of the current pitch lag based on the quadratic nature of the MSE function. The MSE function, MSE(L,b), is computed for pitch gain values which increase monotonically. When a positive MSE value is computed for the current pitch lag, all remaining MSE calculations for the current pitch lag are aborted, as all remaining MSE values would be positive as well.

The third computational savings method involves aborting the calculation of the remaining MSE values in the pitch search procedure of the current pitch lag based on the quadratic nature of the MSE function. The MSE function, MSE(L,b), is computed for pitch gain values which increase monotonically. When an MSE value is computed within the current pitch lag which is not determined to be a new minimum MSE, and when an MSE value has been computed within the current pitch lag which was determined to be a new minimum MSE, all remaining MSE calculations within the current pitch lag are aborted, as the remaining MSE values can not be less than the new minimum MSE. The three computational savings methods described above provide significant power savings in minimization processor 334.

In block 76, the pitch values are quantized. For each pitch subframe, the chosen parameters, $\hat{b}$ and $\hat{L}$, are converted to transmission codes, PGAIN and PLAG. The optimal pitch gain index $\hat{b}$, is an integer value between 1 and 8 inclusive. The optimal pitch lag, $\hat{L}$, is an integer value between 1 and 127 inclusive.

The value of PLAG depends upon both $\hat{b}$ and $\hat{L}$. If $\hat{b}=0$, then PLAG=0. Otherwise, PLAG=$\hat{L}$. Thus, PLAG is represented using seven bits. If $\hat{b}=0$, then PGAIN=0. Otherwise, PGAIN=$\hat{b}-1$. Thus, PGAIN is represented using three bits. Note that both $\hat{b}=0$ and $\hat{b}=1$ result in PGAIN=0. These two cases are distinguished by the value of PLAG, which is zero in the first and non-zero in the second case.

Except for eighth rate, each pitch subframe encompasses two codebook subframes. For each codebook subframe the optimal codebook index, $\hat{I}$, and the optimal codebook gain, $\hat{G}$, are determined in the codebook search procedure of block 80. For eighth rate, only one codebook index and one codebook gain are determined and the codebook index is discarded before transmission.

Figure 9:
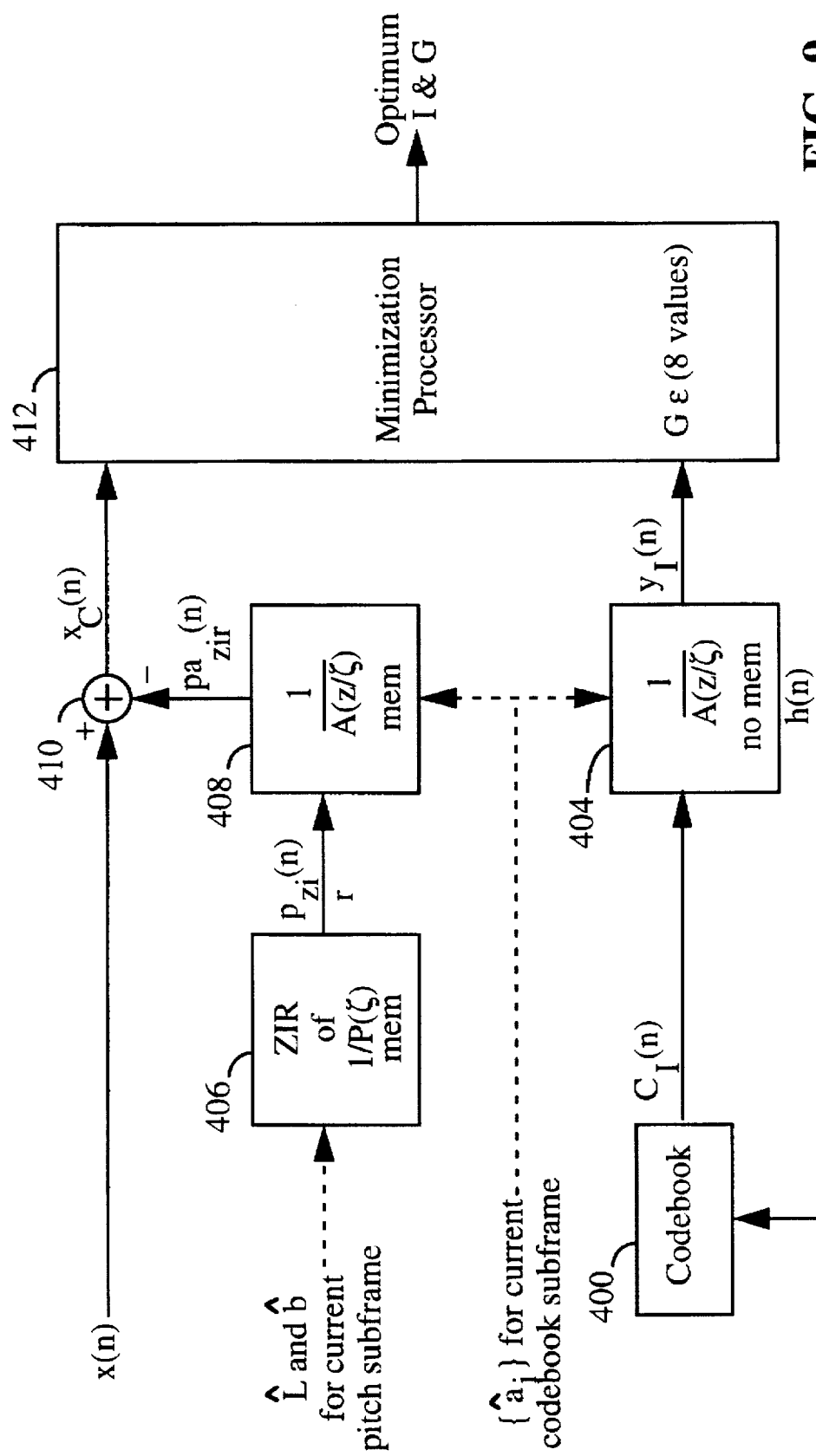
FIG. 9 is an illustration of the codebook search operation as performed in the exemplary embodiment of the present invention.

Referring to FIG. 9, in the exemplary embodiment, the excitation codebook provided by codebook 400 consists of $2^M$ code vectors, where M=7.

The circular codebook, in the exemplary embodiment, consists of the 128 values given in Table IV below. The values are in signed decimal notation and are stored in ROM E 114.

TABLE IV

| n | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 |
|---|---|---|---|---|---|---|---|---|---|---|----|----|----|----|----|----|----|----|----|----|----|----|----|----|----|----|----|----|
| c(n) | 0.0 | −2.0 | 0.0 | −1.5 | 0.0 | 0.0 | 0.0 | 0.0 | 0.0 | 0.0 | 0.0 | 0.0 | 0.0 | 0.0 | 0.0 | 0.0 | 0.0 | −1.5 | −1.0 | 0.0 | 0.0 | 0.0 | 0.0 | 0.0 | 0.0 | 0.0 | 0.0 | 0.0 |

| n | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 |
|---|----|----|----|----|----|----|----|----|----|----|----|----|----|----|----|----|----|----|----|----|----|----|----|----|----|----|----|----|----|----|
| c(n) | 0.0 | 0.0 | 0.0 | 2.5 | 0.0 | 0.0 | 0.0 | 0.0 | 0.0 | 0.0 | 2.0 | 0.0 | 0.0 | 1.5 | 1.0 | 0.0 | 1.5 | 2.0 | 0.0 | 0.0 | 0.0 | 0.0 | 0.0 | 0.0 | 0.0 | 0.0 | 0.0 | 0.0 | 0.0 | 0.0 |

| n | 58 | 59 | 60 | 61 | 62 | 63 | 64 | 65 | 66 | 67 | 68 | 69 | 70 | 71 | 72 | 73 | 74 | 75 | 76 | 77 | 78 | 79 | 80 | 81 | 82 | 83 | 84 | 85 |
|---|----|----|----|----|----|----|----|----|----|----|----|----|----|----|----|----|----|----|----|----|----|----|----|----|----|----|----|----|
| c(n) | 0.0 | 0.0 | 0.0 | 1.5 | 0.0 | 0.0 | −1.5 | 1.5 | 0.0 | 0.0 | −1.0 | 0.0 | 1.5 | 0.0 | 0.0 | 0.0 | 0.0 | 0.0 | 0.0 | 0.0 | −2.5 | 0.0 | 0.0 | 0.0 | 0.0 | 1.5 | 0.0 | 0.0 |

| n | 86 | 87 | 88 | 89 | 90 | 91 | 92 | 93 | 94 | 95 | 96 | 97 | 98 | 99 | 100 | 101 | 102 | 103 | 104 | 105 | 106 | 107 | 108 | 109 |
|---|----|----|----|----|----|----|----|----|----|----|----|----|----|----|-----|-----|-----|-----|-----|-----|-----|-----|-----|-----|
| c(n) | 0.0 | 1.5 | 0.0 | 0.0 | 0.0 | 0.0 | 0.0 | 0.0 | 0.0 | 2.0 | 0.0 | 0.0 | 0.0 | 0.0 | 0.0 | 0.0 | 0.0 | 0.0 | 0.0 | 1.5 | 3.0 | −1.5 | −2.0 | 0.0 |

| n | 110 | 111 | 112 | 113 | 114 | 115 | 116 | 117 | 118 | 119 | 120 | 121 | 122 | 123 | 124 | 125 | 126 | 127 |
|---|-----|-----|-----|-----|-----|-----|-----|-----|-----|-----|-----|-----|-----|-----|-----|-----|-----|-----|
| c(n) | −1.5 | −1.5 | 1.5 | −1.5 | 0.0 | 0.0 | 0.0 | 0.0 | 0.0 | 0.0 | 0.0 | 0.0 | 0.0 | 0.0 | 0.0 | 0.0 | 0.0 | 0.0 |

The method used to select the codebook vector index I and codebook gain G is an analysis-by-synthesis method similar to that used for the pitch search procedure. The chosen codebook index $\hat{I}$ and the chosen codebook gain $\hat{G}$, are the allowable values of $\hat{I}$ and $\hat{G}$ which minimize the mean square error MSE(I,G) of equation 50, between the weighted synthesized speech $y_1(n)$ and the perceptually weighted speech with pitch estimate removed, $x_c(n)$. Referring to FIG. 9, the weighted speech, $x_c(n)$, is generated as follows. The same perceptually weighted speech, x(n), generated in pitch search for the current subframe is used here. Due to the absence of pitch search in the eighth rate, x(n) is generated in the codebook search for this rate. x(n) is provided to a first input of summer 410. Using the optimal pitch lag, $\hat{L}$, and optimal pitch gain, $\hat{b}$, which were extracted in the pitch search for the current subframe, and the current state memories of the pitch filter 506, the ZIR of the pitch synthesis filter 506, $p_{zir}(n)$, is computed in ZIR element 406.

The ZIR is then passed through weighted synthesis filter 408 and the output $p_{zir}(n)$ is subtracted from $x(n)$ in summer 410. The output of summer 410, $x_c(n)$, is normalized and provided to minimization processor 412.

The codebook vector $C_I(n)$ is provided by codebook 400 in response to a codebook index, I, in accordance with equation 53. Impulse response, $h(n)$, of weighted synthesis filter 404, already determined in the pitch search procedure for the current pitch subframe is used in the exemplary embodiment. In the eighth rate, however, $h(n)$ is computed in the codebook search in weighted synthesis filter 404. In the exemplary embodiment, the impulse response, $h(n)$, is truncated to the first 20 samples.

Due to the recursive nature of the codebook, a recursive convolution procedure similar to that used in the pitch search is used in the codebook search. The convolution is computed as shown in equation 52 below.

$$y_I(n) = \sum_{i=0}^{19} h(i)C_I(n-i), 0 \leq I < 128, 0 \leq n < L_C. \quad (52)$$

The codebook vector for index I, $C_I(n)$, is defined shown in equation 53 below.

$$C_I(n) = \begin{cases} c((n-I),\text{mod}128) & n-I \geq 0 \\ c(128+(n-I)) & n-I < 0 \end{cases} \quad 0 \leq I < 128, 0 \leq n < L_C \quad (53)$$

A full convolution is performed for index I=0 in accordance with equation 54. The output $y_0(n)$ is stored in RAM C 182. For the remaining indices, I=1 to I=127, the convolution is performed recursively as shown in equations 55–57 below.

$$y_0(n) = h(n)*C_0(n) = \sum_{i=0}^{19} h(i)C_0(n-i), 0 \leq n < L_C \quad (54)$$

$$y_I(n) = \begin{cases} h(0)C_I(0) & n=0, 1 \leq I < 128 \quad (55) \\ y_{I-1}(n-1) + h(n)C_I(n) & 1 \leq n < 20, 1 \leq I < 128 \quad (56) \\ y_{I-1}(n-1) & 20 \leq n < L_C, 1 \leq I < 128 \quad (57) \end{cases}$$

As in the pitch search, the performance of the codebook search recursive convolution is optimized by the triple partitioned RAMs and a ROM E 114 in DSP core 4.

Computing the convolution values in equation 56, and producing a result each clock cycle is then possible. For example, in a single cycle, $y_{18}(10)$ is calculated, $y_{18}(9)$ is stored, $y_{17}(10)$ is fetched, and $h(10)$ is fetched. Thus, equation 56 above can produce a result each clock cycle. Producing a result each clock cycle for equation 57 above is also possible. For example, in a single cycle, $y_{18}(24)$ is computed, $y_{17}(24)$ is fetched, and $y_{18}(23)$ is stored.

The ability to perform equations 56 and 57 without the need to move the previously calculated weighted synthesized speech samples $y_{I-1}(n-1)$ to the same source RAM between each codebook index update requires a storage strategy and hardware capability referred to as ping-ponging in which the source and destination RAMs a swapped between each index update. When computing $y_I(n)$ for even codebook index values, $y_{I-1}(n-1)$ values are fetched from a first of three RAMs and results are stored in a second of three RAMs. When computing $y_I(n)$ for odd codebook index values, $y_{I-1}(n-1)$ values are fetched from a second of three RAMs and results are stored in a first of three RAMs. This ping-ponging eliminates the need to move the previously calculated $y_{I-1}(n-1)$ values to the same RAM between each codebook index update.

Figure 10:
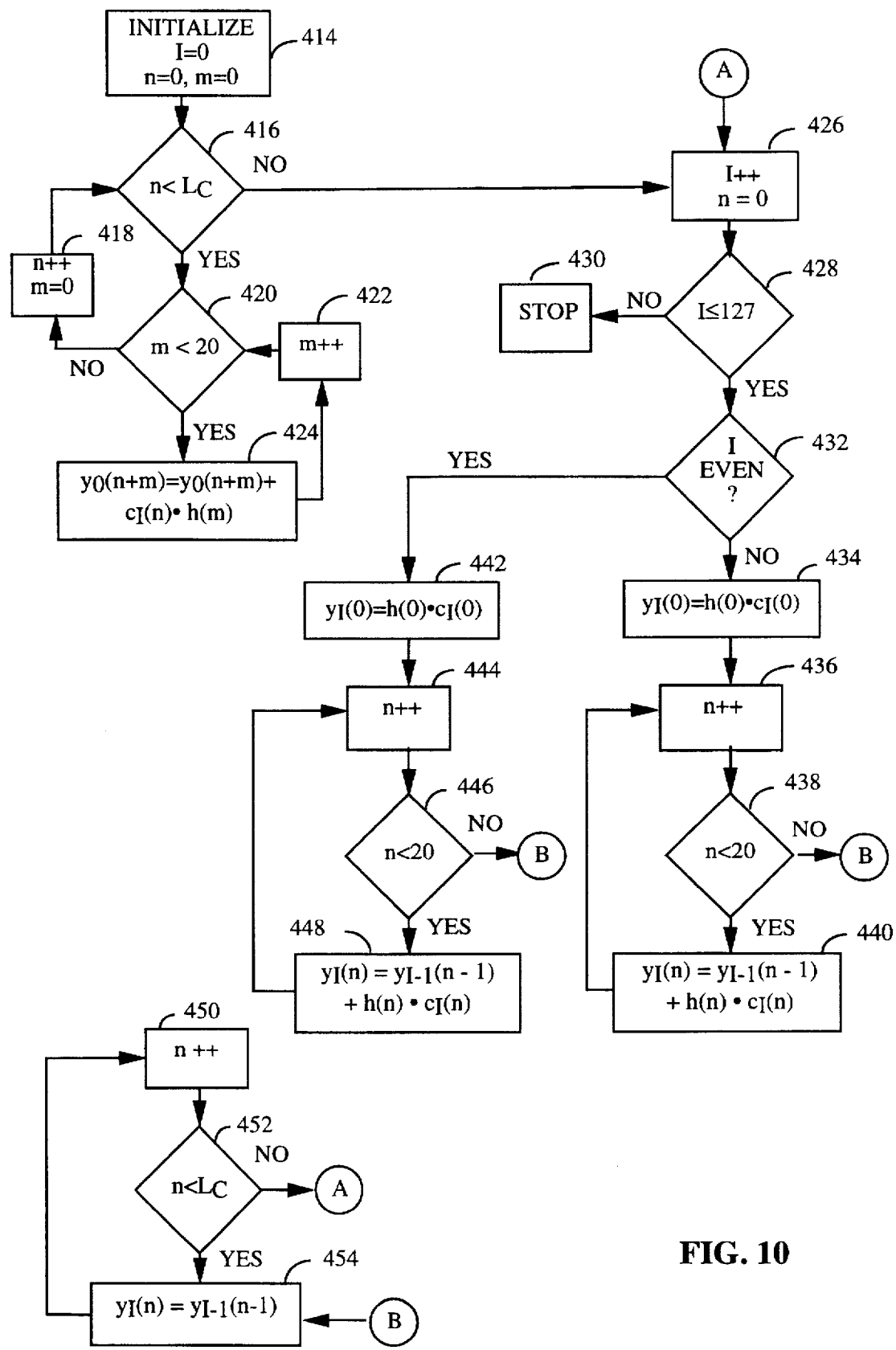
FIG. 10 is a flowchart of the codebook search operation of the exemplary embodiment of the present invention.

FIG. 10 is a flow diagram for the execution of the recursive convolution portion (both initial non-recursive and recursive convolutions) of the codebook search in the exemplary embodiment. In block 414, the codebook index, I, is initialized to its lowest value which is 0 in the exemplary embodiment. The sample number, n, and the index, m, are set to zero, and the values of $y_0(n)$ are set to zero. Blocks 416 through 424 form the initial convolution loop which is computed in a non-recursive manner. The computation of the initial convolution, where I=0, is performed in accordance with equation 58 below.

$$y_0(n) = \sum_{i=0}^{19} h(i)C_0(n-i), 0 \leq n < L_C \quad (58)$$

The computation of the initial convolution uses fixed length loops to reduce computational complexity. In this manner, the overhead required to set up a variable length loop structure within the inner loop (blocks 320–324) of equation 58 is avoided. Each $y_0(n)$ value is sent to minimization processor 412 after it is computed.

Block 416 tests the sample index, n. If n is equal to the codebook subframe length, $L_c$, then the first convolution is complete and flow continues to block 426. If, in block 416, n is less than the codebook subframe length, then flow continues to block 420. Block 420 tests index, m. If m is equal to the filter impulse response length, 20, in the exemplary embodiment, then the current iteration is complete and flow continues to block 418 where m is set to 0 and n is incremented. Flow then returns to block 416. If, in block 420, m is less than the filter impulse response length, 20, then flow continues to block 424 where the partial sums are accumulated. Flow continues to block 422 where the index, m, is incremented and the flow proceeds to block 420.

The operations involved in the initial convolution loop formed by blocks 414 to 424 are performed in DSF core 4 where appropriate pipelining is provided to allow the accumulation of products as shown in block 424. The following operations illustrate the pipelining of the computations and occur in DSF core 4 in a single clock cycle. The filter response value, $h(m+1)$, is fetched from RAM A 104 and provided to AREG 130. The codebook vector value, $C_1(n)$, is fetched from ROM E, 114, and provided to BREG 134. The partial sum, $y_0(n+m-1)$, residing in COREG 164 is provided to RAM C 182 through multiplexers 168 and 180. The partial sum $y_0(n+m+1)$, is provided by RAM C 182 and to DREG 156. The values, $h(m)$ and $C_1(n)$, in AREG 130 and BREG 134 respectively are provided to multiplier 132. The output of multiplier 132 is provided through multiplexer 138 and disabled barrel shifter 140, to a first input of summer 146. The partial sum, $y_0(n+m)$, is provided by DREG 156 through multiplexer 154, disabled inverter 152 and disabled barrel shifter 150, to a second input of summer 146. In the exemplary embodiment, the center clipped Gaussian codebook $C_1(n)$ contains a majority of zero values. To take advantage of this situation, as a power saving feature, DSP core 4 first checks to see if the codebook vector is zero in block 424. If it is zero, the multiplication and addition step, normally performed in block 424 and explained above, are skipped. This procedure eliminates multiplication and addition operations roughly 80% of the time thus saving power. The output of summer 146 is provided through multiplexer 148 to COREG 164. This value in COREG is then provided through multiplexers 168 and 180 to RAM C 182. When index n reaches its maximum allowable value in block 416, the initial convolution is complete and the partial sums present in RAM C 182 are now the final result of the convolution.

When the initial convolution is complete, flow continues to block 426 where recursive convolution is performed in the calculations for the remaining codebook index values.

In block 426, the sample index, n, is set to zero and the codebook index, I, is incremented. Flow continues to block 428. Block 428 tests I. If I is greater than or equal to 128, the maximum codebook index value, in the exemplary embodiment, then flow continues to block 430, where the codebook search operation terminates. If I is less than or equal to 127 then flow continues to block 432. Block 432 controls the ping-ponging operation described previously. In block 432, I is tested to determine if it is even or odd. If I is even, then flow continues to block 442 (operation described as Case I). If I is odd, then flow continues to block 434 (operation described as Case II).

Case I: (Even Values of Codebook Index, I)

In block 442, $y_1(0)$ is computed in accordance with equation 55. Address unit A 102 provides an address value to RAM A 104, which in response provides h(0) through multiplexer 108 to AREG 130. In the same clock cycle address unit E 112 provides an address value to ROM E 114, which in response provides $C_1(0)$ through multiplexer 116 to BREG 134. During the next cycle AREG 130 provides h(0) and BREG 134 provides $C_1(0)$ to multiplier 132, where the two values are multiplied and the product is provided through multiplexer 138 and through disabled barrel shifter 140 to a first input of summer 146. The second input of summer 146 is provided with zero through multiplexer 154, disabled inverter element 152, and barrel shifter 152. The output of summer 146 is provided to COREG 164 through multiplexer 148. During the same clock cycle $y_{l-1}(0)$ and h(1) are fetched from RAM B 122 and RAM A 104 and provided to DREG 156 and AREG 130 through multiplexers 158 and 100 respectively.

In block 444, the synthesized speech sample index, n, is incremented. In control block 446, if the synthesized speech sample index, n, is less than 20, then flow proceeds to block 448.

In block 448, a new $y_1(n)$ is computed each clock cycle in accordance with equation 56. Appropriate setup, required prior to the first iteration of block 448 in order to initialize the values of $y_{l-1}(n-1)$ and h(n) was achieved in block 442 as described above. Appropriate cleanup is also required subsequent to the last iteration of block 448 in order to store the final value of $y_1(19)$.

In the first iteration of block 448, $y_1(0)$, computed in block 442 is present in COREG 164. COREG 164 provides $y_1(0)$ through multiplexers 168 and 180 to RAM C 182 for storage, with address value provided to RAM C 182 from address unit C 186. $y_1(0)$ is provided to minimization processor 412 at the same time it is provided to RAM C 182.

In block 448, the following operations are performed in a single clock cycle. The $y_{l-1}(n)$ value is provided by RAM B 122, in accordance with an address provided by address unit B 120, through multiplexers 116 and 158 to DREG 156. The impulse response value, h(n+1), is provided by RAM A 104, in accordance with an address provided by address unit A 102, through multiplexer 108 to AREG 130. DREG 156 provides $y_{l-1}(n-1)$ through multiplexer 154, disabled inverter element 152, and barrel shifter 150, to a first input of summer 146. AREG 130 provides h(n) and BREG 134 provides $C_1(n)$ to multiplier 132, where the two values are multiplied and the product is provided by multiplier 132 through multiplexer 138, through disabled barrel shifter 140, to a second input of summer 146. The output of summer 146 is provided through multiplexer 148 to COREG 164. The value in COREG 164, computed in the previous iteration, is provided through multiplexers 168 and 180 to RAM C 182 for storage and to minimization processor 412.

In control block 446, if the synthesized speech sample index, n, is equal to 20, then $y_1(19)$, computed in the final iteration, is provided through multiplexers 168 and 124 to RAM B 122, for storage in a circular buffer and to the minimization processor 412, before flow proceeds to block 454.

End of Case I

Case II: (Odd Values of Codebook Index, I)

In block 434, $y_1(0)$ is computed in accordance with equation 55. Address unit A 102 provides an address value to RAM A 104, which in response provides h(0) through multiplexer 108 to AREG 130. In the same clock cycle, address unit E 112 provides an address value to ROM E 114, which in response provides $C_1(0)$ through multiplexer 116 to BREG 134. During the next cycle AREG 130 provides h(0) and BREG 134 provides $C_1(0)$ to multiplier 132, where the two values are multiplied and the product is provided through multiplexer 138 through disabled barrel shifter 140 to a first input of summer 146. The second input of summer 146 is provided with zero through multiplexer 154, disabled inverter element 152, and barrel shifter 152. The output of summer 146 is provided to COREG 164 through multiplexer 148. During the same clock cycle $y_{l-1}(0)$ and h(1) are fetched from RAM C 182 and RAM A 104 and provided to DREG 156 and AREG 130 through multiplexers 158 and 100 respectively.

In block 436, the synthesized speech sample index, n, is incremented. In control block 438, if the synthesized speech sample index, n, is less than 20, then flow proceeds to block 440.

In block 440, a new $y_1(n)$ value is computed each clock cycle in accordance with equation 56. Appropriate setup, required prior to the first iteration of block 440 in order to initialize the values of $y_{l-1}(n)$ and h(n) was achieved in block 434 as described above. Appropriate cleanup is also required subsequent to the last iteration of block 440 in order to store the final value of $y_1(19)$.

In the first iteration of block 440, $y_1(0)$, computed in block 434, is present in COREG 164. COREG 164 provides $y_1(0)$ through multiplexers 168 and 180 to RAM B 122 for storage, with address value provided to RAM B 122 from address unit B 120. $y_1(0)$ is provided to minimization processor 412 at the same time it is provided to RAM B 122.

In block 440, the following operations are performed in a single clock cycle. The $y_{l-1}(n)$ value is provided by RAM C 182, in accordance with an address provided by address unit C 186, through multiplexer 158 to DREG 156. The impulse response value, h(n+1), is provided by RAM A 104, in accordance with an address provided by address unit A 102, through multiplexer 108 to AREG 130. DREG 156 provides $y_{l-1}(n-1)$, through multiplexer 154, disabled inverter element 152, and barrel shifter 150, to a first input of summer 146. AREG 130 provides h(n) and BREG 134 provides $C_1(n)$ to multiplier 132, where the two values are multiplied and the product is provided by multiplier 132 through multiplexer 138 through barrel shifter 140 to a second input of summer 146. The output of summer 146 is provided through multiplexer 148 to COREG 164. The value in COREG 164, computed in the previous iteration, is provided through multiplexers 168 and 124 to RAM B 122 for storage and to minimization processor 412.

In block 436, the synthesized speech sample index, n, is incremented. In control block 438, if the synthesized speech sample index, n, is equal to 20, then $y_1(19)$ computed in the final iteration, is provided through multiplexers 168 and 124 to RAM B 122 for storage in a circular buffer within RAM B 122, and to minimization processor 412, before flow proceeds to block 454.

End of Case II

Prior to the first iteration of block 454, $y_{l-1}(19)$ is fetched from the circular buffer in RAM B 122 and loaded into BREG 134. $y_{l-1}(19)$ is then moved from BREG 134 to COREG 164, after which $y_{l-1}(20)$ is fetched from the circular buffer in RAM B 122 and loaded into BREG 134.

In block 454, a new $y_1(n)$ is computed each clock cycle in accordance with equation 57. The following operations are performed in a single clock cycle. $y_{l-1}(n-2)$ is provided by BREG 134 to COREG 164. $y_{l-1}(n-3)$ is fetched from the circular buffer within RAM B 122 and loaded into BREG 134. $y_{l-1}(n-1)$ present in COREG 164 is presented to minimization processor 412. Following the last iteration of block 454, $y_{l-1}(L_c-2)$ is deleted from the circular buffer within RAM B 122. By adding an element to and deleting an element from the circular buffer within RAM B 122 each codebook index, the size of this circular buffer is maintained at $L_c-19$.

The implementation of the circular buffer within RAM B 122 is accomplished through special address registers in address unit B 120, which dictate the wrap around points so that a sequential memory can be addressed automatically in a circular fashion.

In block 450, the synthesized speech sample index, n, is incremented. In control block 452, if the synthesized speech sample index, n, is less than $L_c$, then flow proceeds again to block 454. If the synthesized speech sample index, n, is equal to $L_c$, then all $y_1(n)$ values have been computed for the current codebook index value, I, and flow returns to block 426.

Prior to the calculation of the synthesized speech samples, $y_1(n)$, a sequence of length $L_c$ of perceptually weighted speech samples, $x_c(n)$, are provided to minimization processor 412. As described previously, sequences of synthesized speech samples, $y_1(n)$, of length $L_c$ for codebook vector index values I=0 through I=127 are provided to minimization processor 412 during the initial and recursive convolution calculations. The synthesized speech samples are provided sequentially to minimization processor 412. Minimization processor 412 calculates the autocorrelation of each synthesized speech sample sequence, $y_1(n)$, and the cross-correlation between each synthesized speech sample sequence, $y_1(n)$, and the sequence of perceptually weighted speech samples, $x_c(n)$. From these correlation values, minimization processor 412 then calculates a relative measure of the MSE between each synthesized speech sample sequence, $y_1(n)$, and the sequence of perceptually weighted speech samples, $x_c(n)$. For each codebook vector index, I, the MSE is calculated for all possible codebook gain values, G, of the synthesized speech sample sequence. Minimization processor 412 finds the minimum MSE over all codebook vector index values, I, and all possible codebook gain values, G, by maintaining the value of the minimum MSE through the current codebook vector index, I, and the current codebook gain, G. The codebook vector index estimate, $\hat{I}$, and codebook gain index estimate, $\hat{G}$, corresponding to the minimum MSE are also maintained by minimization processor 412. Each new MSE value is compared to the MSE minimum maintained in minimization processor 412. If the new MSE is less than the minimum MSE, then the minimum MSE is replaced by the new MSE value and the codebook vector index estimate, $\hat{I}$, and the codebook gain estimate index, $\hat{G}$, are updated to reflect the new minimum MSE. The minimum MSE and corresponding codebook vector index estimate, $\hat{I}$, and codebook gain estimate index, $\hat{G}$, maintained in minimization processor 412 are initialized each codebook subframe using the first MSE value calculated during that codebook subframe. After all codebook vector indices, I, and all codebook gain values, G, are exhausted, the codebook vector index estimate, $\hat{I}$, and the codebook gain estimate index, $\hat{G}$, will be the optimal codebook vector index and the optimal codebook gain index respectively for the current codebook subframe. Minimization processor 412 provides the optimal codebook vector index, $\hat{I}$, and the optimal codebook gain estimate index, $\hat{G}$, to DSP core 4 through inports 12. The optimal codebook vector index, $\hat{I}$, and the optimal codebook gain estimate index, $\hat{G}$, are those which result in the minimum MSE between the perceptually weighted speech samples, $x_c(n)$, and the weighted synthesized speech samples, $y_1(n)$. The MSE is a function of codebook index, I, and codebook gain, G, as described by equations 59 through 61 below.

$$MSE(I,G) = \sum_{n=0}^{L_c-1} (x_c(n) - Gy_I(n))^2 \tag{59}$$

$$= \sum_{n=0}^{L_c-1} (x_c(n))^2 - 2G \sum_{n=0}^{L_c-1} (x_c(n)y_I(n)) + G^2 \sum_{n=0}^{L_c-1} (y_I(n))^2 \tag{60}$$

$$= Ex_c x_c - 2GEx_c y_I + G^2 Ey_I y_I \tag{61}$$

$Ex_c x_c$ is the autocorrelation of the perceptually weighted speech samples, $x_c(n)$. $Ex_c y_I$ is the cross-correlation between the perceptually weighted speech samples, $x_c(n)$, and the weighted synthesized speech samples, $y_1(n)$. $Ey_I y_I$ is the autocorrelation of the perceptually weighted synthesized speech samples, $y_1(n)$.

The autocorrelation, $Ex_c x_c$, of the perceptually weighted speech samples, $x_c(n)$, is not a function of codebook gain, G. $Ex_c x_c$ remains constant during each codebook subframe and therefore does not influence the selection of the optimal codebook vector index and the optimal codebook gain. Minimization of equations 59 through 61 over codebook vector index, I, and codebook gain, G, is equivalent to minimization of equation 62 below.

$$MSE(I,G) = -2GEx_c y_I + G^2 Ey_I y_I \tag{62}$$

Minimization processor 412 computes the autocorrelations, $Ey_1 Y_1$, of the weighted synthesized speech sample sequences, $y_1(n)$, and the cross-correlations, $Ex_c y_1$, between the perceptually weighted speech sample sequence, $x_c(n)$, and the weighted synthesized speech sample sequences, $y_1(n)$. For each correlation pair, $(Ex_c y_1, Ey_1 y_1)$, minimization processor 412 computes the relative MSE, according to equation 62 above, for a set of values of codebook gain, G. The calculation of the correlations, $Ex_c y_1$ and $Ey_1 y_1$, are performed simultaneously in minimization processor 412. The relative MSE values are calculated and the decisions regarding MSE minimization are made for codebook vector index I while the correlation values are being calculated for codebook vector index I+1.

FIGS. 6a and 6b illustrate an exemplary embodiment of minimization processor 412. The perceptually weighted speech samples, $x_c(n)$, are provided by DSP core 4 to latch 210, for storage in RAM X 212 in accordance with an address provided by control 220. Two sets of codebook gain values are provided by DSP core 4 to minimization processor 412. One set is for positive codebook gain values, G, and a second set is for negative codebook gain values, –G. In full rate and half rate, scaled codebook gain values, -2G, for G=–4.0 dB through G=+8.0 dB in steps of +4.0 dB, are provided by DSP core 4 through multiplexer 260, for storage in latches 292, 288, 284 and 280 respectively. In quarter rate and eighth rate, scaled codebook gain values, -2G, for G=–4.0 dB through G=+2.0 dB in steps of +2.0 dB, are provided by DSP core 4 through multiplexer 260, for storage in latches 292, 288, 284 and 280 respectively. Corresponding scaled codebook gain values, $G^2$, are provided through multiplexer 260, for storage in latches 290, 286, 282, and 278 respectively. In full rate and half rate, scaled codebook gain values, 2G, for G=−4.0 dB through G=+8.0 dB in steps of +4.0 dB, are provided through multiplexer 260, for storage in latches 276, 272, 268 and 264 respectively. In quarter rate and eighth rate, scaled codebook gain values, 2G, for G=−4.0 dB through G=+2.0 dB in steps of +2.0 dB, are provided through multiplexer 260, for storage in latches 276, 272, 268 and 264 respectively. Corresponding scaled codebook gain values, $G^2$, are provided through multiplexer 260, for storage in latches 274, 270, 266, and 262 respectively. Multiplexer 260 provides values directly to latch 262. Latch 262 provides values directly to latch 264. Latch 276 provides values to latch 278 through multiplexer 294. Latch 290 provides values directly to latch 292 and so on. Shifting values through latches 262 through 292 and multiplexer 294 allows values to be provided through multiplexer 260 to all latches within circular buffer 259. In the codebook search, two circular buffers are provided within circular buffer 259. Following the storage of the perceptually weighted speech samples, $x_c(n)$, and the storage of the codebook gain values, sequences of weighted synthesized speech samples, $y_1(n)$, are provided to latch 210. The weighted synthesized speech samples, $y_1(n)$, are provided by latch 210 to the two inputs of multiplier 216, which produces the squares, $(y_1(n))^2$, of the weighted synthesized speech samples. Latch 210 also provides the weighted synthesized speech samples, $y_1(n)$, to a first input of multiplier 218. RAM X 212 provides the perceptually weighted speech samples, $x_c(n)$, through latch 214, to a second input of multiplier 218. Multiplier 218 computes the product values, $x_c(n)y_1(n)$. A new square, $(y_1(n))^2$, and a new product, $x_c(n)y_1(n)$, are computed each cycle by multipliers 216 and 218 respectively. The sample index, n, varies from 0 through $L_c$−1 for each codebook vector index, I.

The squares, $(y_1(n))^2$, of the weighted synthesized speech samples are provided to accumulator 221. The product values, $x_c(n)y_1(n)$, are provided to accumulator 231. Accumulator 221 computes the sum of the $L_c$ squares for each codebook vector index, I. Accumulator 231 computes the sum of the $L_c$ product values for each codebook vector index, I.

Before each new codebook vector index, latch 226 is provided with zero through multiplexer 224. Accumulator 221 is then ready to compute the autocorrelation, $Ey_1y_1$, for the current codebook vector index, I. In accumulator 221, the squares, $(y_1(n))^2$, are provided to a first input of summer 222. A running total is provided by latch 226 to a second input of summer 222. The newly computed running total is provided by summer 222, through multiplexer 224, to latch 226 for storage. After the accumulation over all $L_c$ values for codebook vector index I, the autocorrelation, $Ey_1y_1$, is provided to latch 228 for storage.

Before each new codebook vector index, latch 236 is provided with zero through multiplexer 234. Accumulator 231, is then ready to compute the cross-correlation, $Ex_cy_1$, for the current codebook vector index, I. In accumulator 231, the product values, $x_c(n)y_1(n)$, are provided to a first input of summer 232. A running total is provided by latch 236 to a second input of summer 232. The newly computed running total is provided by summer 232, through multiplexer 234, to latch 236 for storage. After the accumulation over all $L_c$ values for codebook vector index I, the cross-correlation, $Ex_cy_1$, is provided to latch 238 for storage.

The MSE described by equation 62 is then computed in the two cycle process described below.

In a first of two cycles, latch 238 provides the cross-correlation, $Ex_cy_1$, between the perceptually weighted speech samples and the weighted synthesized speech samples through multiplexer 230 to a first input of multiplier 240. Control 220 monitors $Ex_cy_1$ provided by latch 238. If $Ex_cy_1$ is non-negative then latch 292 provides the scaled codebook gain value, −2G, to a second input of multiplier 240 through multiplexer 296. The product, $-2GEx_cy_1$, is provided by multiplier 240 to a first input of summer 242. If $Ex_cy_1$ is negative then latch 276 provides the scaled codebook gain value, 2G, to a second input of multiplier 240 through multiplexer 296. The product, $2GEx_cy_1$, is provided by multiplier 240 to a first input of summer 242. The second input of summer 242 is provided with zero though multiplexer 246. The output of summer 242 is provided to latch 244 for storage. The sign of $Ex_cy_1$ is stored in control 220. Signs of one and zero for $Ex_cy_1$ correspond to negative and non-negative values of $Ex_cy_1$ respectively. The values in latches 262 through 276 are rotated by providing the output of latch 276 to latch 262 through multiplexer 260. After this rotation, latches 262, 264, 266, 268, 270, 272, 274 and 276 contain the values previously contained in latches 276, 262, 264, 266, 268, 270, 272 and 274 respectively. The values in latches 278 through 292 are rotated by providing the output of latch 292 to latch 278 through multiplexer 294. After this rotation, latches 278, 280, 282, 284, 286, 288, 290 and 292 contain the values previously contained in latches 292, 278, 280, 282, 284, 286, 288, and 290 respectively. One circular buffer is comprised of latches 262 through 276 and multiplexer 260. A second circular buffer is comprised of latches 278 through 292 and multiplexer 294. By rotating the values within a first of two circular buffers in circular buffer 259, latch 292 provides −2G and $G^2$ in the first and the second cycles respectively. By rotating the values within a second of two circular buffers in circular buffer 259, latch 276 provides 2G and $G^2$ in the first and the second cycles respectively. For each pair of correlation and cross-correlation values, only one set of codebook gain pairs is provided by circular buffer 259. The set of codebook gain pairs is provided by the circular buffer comprised of latches 262 through 276 and multiplexer 260 for negative values of $Ex_cy_1$. The set of codebook gain pairs is provided by the circular buffer comprised by latches 278 through 292 and multiplexer 294 for non-negative values of $Ex_cy_1$.

In a second of two cycles latch 228 provides $Ey_1y_1$ through multiplexer 230 to a first input of multiplier 240. Through multiplexer 296, latches 276 and 292 provide the codebook gain value, $G^2$, to a second input of multiplier 240 for negative and non-negative values of $Ex_cy_1$ respectively. The product, $G^2Ey_1y_1$, is provided by multiplier 240 to a first input of summer 242. The second input of summer 242 is provided with the output of latch 244, $\pm 2GEx_cy_1$, though multiplexer 246. Summer 242 provides $\pm 2GEx_cy_1+G^2Ey_1y_1$ to latch 244 for storage. The values in latches 262 through 292 of circular buffer 259 are then rotated as described above.

The two cycle process described above is repeated for all four pairs,($\pm 2G,G^2$), of codebook gain values for each codebook index, I. During the two cycles following the calculation of the current MSE value, $\pm 2GEx_cy_1+G^2Ey_1y_1$, a new MSE value is being computed using the next pair of $\pm 2G$ and $G^2$ values. Before latch 244 is updated with the new MSE value, the current MSE value is compared to the minimum MSE for the current codebook subframe, stored in latch 250. The current MSE value, $\pm 2GEx_cy_1+G^2Ey_1y_1$, is provided by latch 244 to the positive input of subtractor 248. Latch 250 provides the current minimum MSE value to the negative input of subtractor 248. Control 220 monitors the resulting difference output from subtractor 248. If the difference is negative, the current MSE value is a new minimum MSE for the current codebook subframe and is stored in latch 250, and the corresponding codebook vector index estimate, $\hat{I}$, and codebook gain estimate index, $\hat{G}$, are updated in control 220. If the difference is non-negative, the current MSE value is ignored.

Before each codebook subframe, DSP core 4 issues a command to minimization processor 412 informing control 220 that a new codebook subframe will follow. Upon receiving this command the current codebook vector index and the current codebook gain index are set to 0 in control 220. Before each new sequence of weighted synthesized speech samples are provided to minimization processor 412, DSP core 4 issues a command to minimization processor 412, informing control 220 that a new sequence of weighted synthesized speech samples will follow. Upon receiving this command, control 220 increments the current codebook vector index and the current codebook gain index by 1, corresponding to a codebook vector index increment of 1 and a codebook gain increment of 2 dB or 4 dB depending on the rate. While the first sequence of weighted synthesized speech samples are being provided to minimization processor 412, the current codebook vector index and the current codebook gain index will equal 1, corresponding to a codebook index vector of 0 and a codebook gain of G=−8 dB or G=−4 dB depending on the rate. During each codebook subframe, the first MSE value is stored in latch 250, and the corresponding codebook vector index estimate, $\hat{I}$, and the codebook gain estimate index, $\hat{G}$, are updated in control 220. This is done in order to initialize the minimum MSE in latch 250 each codebook subframe. The codebook vector index and the codebook gain index corresponding to the minimum MSE estimates will be provided by control 220 to DSP core 4 along with the sign of the cross-correlation, $Ex_c y_1$, corresponding to the minimum MSE. Should DSP core 4 receive a zero for the sign of $Ex_c y_1$ it will set the optimal codebook gain to G. Should DSP core 4 receive a one for the sign of $Ex_c y_1$, it will set the optimal codebook gain to −G. DSP core 4 uses the codebook vector index estimate and the codebook gain estimate index provided by control 220 to determine the optimal codebook vector and the optimal codebook gain. For full rate and half rate the optimal codebook gain, G, is −4 dB, 0 dB, +4 dB and +8 dB for codebook gain indices $\hat{G}=1$ through $\hat{G}=4$, respectively. For quarter rate and eighth rate the optimal codebook gain, G, is −4 dB, −2 dB, 0 dB and +2 dB for codebook gain indices $\hat{G}=1$ through $\hat{G}=4$ respectively.

In the codebook search, the nature of the MSE function, MSE(I,G), of equation 62 allows computational savings to be achieved. The remaining MSE calculations for the current codebook vector may be aborted when it is determined that the remaining MSE values, yet to be computed for the current codebook vector, can not result in an MSE value which is less than the current minimum MSE stored in latch 250. In the exemplary embodiment, three techniques for computational savings in the codebook search are employed in minimization processor 412. The MSE functions, MSE (I,G), are quadratic in G. One quadratic equation is formed for each codebook vector index, I. All of these quadratic equations pass through the origin, G=0 and MSE(I,G)=0.

The first computational savings method involves searching over either positive or negative codebook gain values depending on the sign of $Ex_c y_1$. A negative value of $Ex_c y_1$ and a negative gain value will result in a negative value for the term $-2GEx_c y_1$ of equation 62. A positive value of $Ex_c y_1$ and a positive gain value will also result in a negative value for the term $-2GEx_c y_1$ of equation 62. Because the term $G^2 Ey_1 y_1$ of equation 62 is always positive, a negative value of the term $-2GEx_c y_1$ will tend to minimize the MSE. Two sets of codebook gain pairs are provided to circular buffer 259, one with positive codebook gain values and the second with negative codebook gain values. In this manner, only four pairs of gain values need to be used instead of eight gain pairs for each codebook vector index, I.

The second computational savings method involves aborting the calculation of the remaining MSE values in the codebook search procedure of the current codebook vector based on the quadratic nature of the MSE function. The MSE function, MSE(I,G), is computed for codebook gain values which increase monotonically. When a positive MSE value is computed for the current codebook vector, all remaining MSE calculations for the current codebook vector are aborted, as the corresponding MSE values will be greater than the current MSE value.

The third computational savings method involves aborting the calculation of the remaining MSE values in the codebook search procedure of the current codebook index vector based on the quadratic nature of the MSE function. The MSE function, MSE(I,G), is computed for codebook gain values which increase monotonically. When an MSE value is computed within the current codebook vector which is not determined to be a new minimum MSE, and when an MSE value has been computed within the current codebook vector which was determined to be a new minimum MSE, all remaining MSE calculations within the current codebook vector are aborted, as the remaining MSE values can not be less than the new minimum MSE. The three computational savings methods described above provide significant power savings in minimization processor 412.

In block 84 the codebook values are quantized. Block 86 checks if all codebook subframes are processed. If all codebook subframes have not been processed then flow returns to block 80. If all codebook subframes have been processed, then flow proceeds to block 88. Block 88 checks if all pitch subframes have been processed. If all pitch subframes have not been processed then flow returns to block 70. If all pitch subframes have been processed then flow proceeds to block 90.

In block 90, the encoded results are packed in a specific format. At full rate, 22 bytes of data are read by a microprocessor (not shown). 10 bytes are read at half rate, 5 at quarter rate, and 2 at eighth rate. At full rate, 11 parity check bits are generated to provide error correction and detection for the 18 most important bits of the full rate data.

The encoder, at the transmitter, must maintain the state of the decoder, at the receiver, in order to update the filter memories, which are in turn used by the encoder in the pitch and codebook search procedures. In the exemplary embodiment, the encoder contains a version of the decoder which is used after every codebook subframe.

Figure 11:
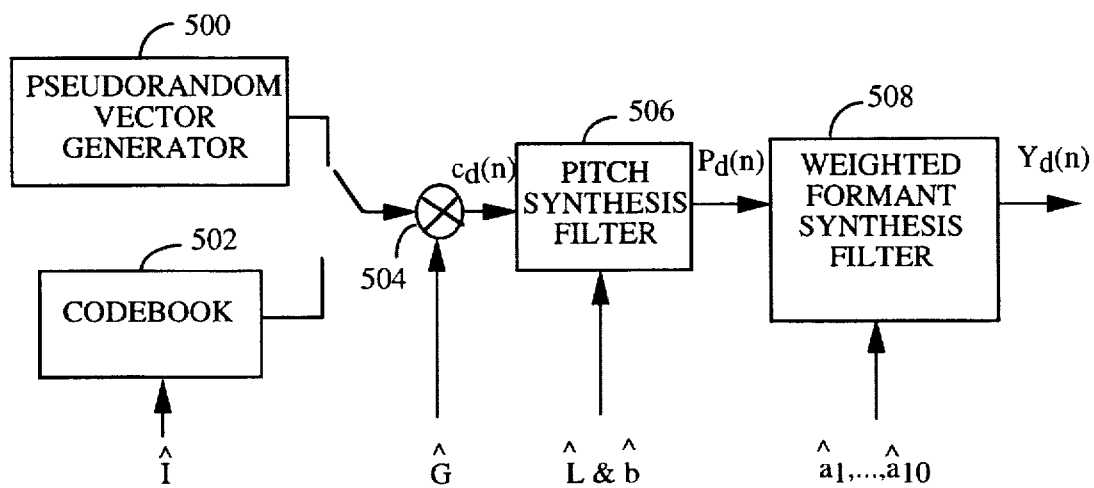
FIG. 11 is a block diagram of encoder's decoder responsible for keeping the filter memories of the encoder at one end and the decoder at the other end of the communications link the same in the vocoding operation of the exemplary embodiment of the present invention.

The following decoding operations are performed in DSP core 4 as a part of the encoder. Referring to FIG. 11, the optimal codebook vector index, $\hat{I}$, and the optimal codebook gain, $\hat{G}$, determined for the current codebook subframe, are used to generate a scaled codebook vector, $C_d(n)$. Except in eighth rate, codebook 502 is provided with the optimal codebook index, $\hat{I}$, determined for the current codebook subframe and in response provides a corresponding excitation vector to a first input of multiplier 504. In the case of eighth rate, a pseudo-random sequence is generated for $C_d(n)$ by pseudo-random vector generator 500 and provided to a first input of multiplier 504. The optimal codebook gain, Ĝ, determined for the current codebook subframe, is provided to a second input of multiplier 504. This sequence is generated by the same pseudo-random generation operation that is used by the decoder at the receiver.

The scaled codebook vectors, $C_z(n)$, are provided to pitch synthesis filter 506 which generates formant residual $P_z(n)$. The pitch synthesis filter memories are initialized with the final state resulting from the last sample of speech generated. Pitch synthesis filter 506 uses the optimal pitch lag, $\hat{L}$, and the optimal pitch gain, $\hat{b}$, determined for the current pitch subframe. For eighth rate, the optimal pitch gain is set to 0. The final state of the pitch synthesis filter memories is preserved for use in generating speech for the next pitch subframe, as mentioned above, and for use in the subsequent pitch searches and decoding operations within the encoder.

Weighted formant synthesis filter 508 generates the output, $Y_z(n)$, from formant residual, $P_z(n)$. This filter is initialized with the final state resulting form the last sample of speech generated. The LPC coefficients computed from the interpolated LSP values for the current subframe are used as coefficients for this filter. The final state of this filter is saved for use in generating speech for the next codebook subframe, and for use in the following pitch and codebook searches.

The decoding operation, shown by blocks 44 and 50 in FIG. 2, is performed in DSP core 4. The ASIC receives a packet in a specified format from a microprocessor (not shown) through microprocessor interface 42. DSP core 4 decodes the data in this packet and uses it to synthesize speech samples which are supplied to a codec (not shown) through PCM interface 2. In DSP core 4, the received packet is unpacked to obtain the data needed to synthesize speech samples. The data includes the encoding rate, LSP frequencies, and the pitch and codebook parameters for the corresponding subframes for that rate. The synthesis of speech samples from the received packet data is performed in DSP core 4 and is shown in FIG. 12.

Figure 12:
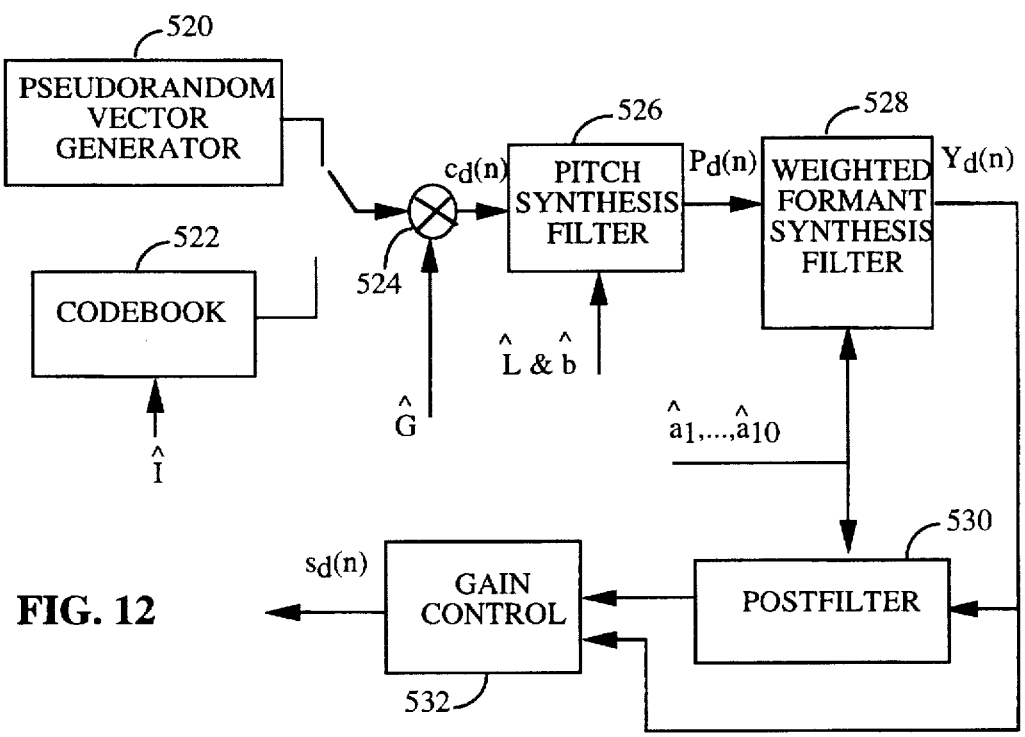
FIG. 12 is a block diagram of the decoder of the exemplary embodiment of the present invention.

Referring to FIG. 12, the optimal codebook vector index, $\hat{I}$, and the optimal codebook gain, $\hat{G}$, corresponding to the current codebook subframe, are used by the decoder to generate the scaled codebook vectors, $C_z(n)$. Except in eighth rate, codebook 522 is provided with the optimal codebook index, $\hat{I}$, corresponding to the current codebook subframe and in response provides the corresponding excitation vector to a first input of multiplier 524. In the case of eighth rate, a pseudo-random sequence is generated for $C_z(n)$ by pseudo-random vector generator 520 and provided to a first input of multiplier 524. This sequence is generated by the same pseudo-random generation operation that is used by the decoder at the receiver. The optimal codebook gain value, $\hat{G}$, corresponding to the current codebook subframe, is provided to a second input of multiplier 524.

The scaled codebook vectors, $C_z(n)$, are provided to pitch synthesis filter 526 which generates formant residual, $P_z(n)$. The pitch synthesis filter memories are initialized with the final state resulting from the last sample of speech generated. Pitch synthesis filter 526 uses the optimal pitch lag, $\hat{L}$, and the optimal pitch gain, $\hat{b}$, corresponding to the current pitch subframe. For eighth rate, the optimal pitch gain is set to 0. The final state of the pitch synthesis filter is saved for use in generating speech for the next pitch subframe as mentioned above.

Weighted formant synthesis filter 528 generates the output, $Y_z(n)$, from formant residual, $P_z(n)$. This filter is initialized with the final state resulting form the last sample of speech generated. The LPC coefficients computed from the interpolated LSP values for the current subframe are used as coefficients for this filter. The final state of the filter is saved for use in generating speech for the next codebook subframe.

The decoded speech, $Y_z(n)$, is provided to post-filter 530 which, in the exemplary embodiment, is a long term post-filter based on the LPC coefficients for the current subframe being decoded. Post-filter 530 filters the reconstructed speech samples, $Y_z(n)$, and provides the filtered speech to gain control 532. Gain control 532 controls the level of the output speech, $s_z(n)$, and has the ability to perform automatic gain control (AGC).

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. An apparatus for performing a block normalization comprising:

magnitude determination means for receiving a set of values and for determining a magnitude of a received value of said set of values and providing corresponding magnitude values;

OR-gate means for receiving said magnitude values, receiving a partial union value and providing a next partial union value; and register means for receiving said next partial union value and for providing said partial union value and wherein the final value remaining in said register means is indicative of a normalization factor.

2. The apparatus of claim 1 wherein said magnitude determination means comprises:

inversion means for receiving said set of values and selectively bit inverting the bits of said value when said value is negative; and summing means for adding a single bit to said selectively bit inverted value when said value is negative.

3. The apparatus of claim 1 further comprising:

shift register means for determining a shift normalization value in accordance with said normalization factor and for providing said shift normalization value; and barrel shifter means for receiving said shift normalization value for shifting a second set of values in accordance with said shift normalization value.

4. An apparatus for normalizing a block of values representative of respective data bits, comprising:

an inverter means for determining the absolute value of each of the values and outputting respective magnitude signals representative thereof;

an OR gate for consecutively receiving the magnitude signals and for generating respective OR gate output signals in response thereto;

an accumulator means for receiving the OR gate output signals and for generating an accumulator output signal, the accumulator output signal being input to the OR gate, the accumulator means representing a scaling factor upon inputting of all values representative of the data bits in the block to the OR gate; and shifter means for modifying the values in accordance with the scaling factor.

5. The apparatus of claim 4, wherein the inverter means includes:

an inverter for receiving the values and selectively bit inverting the bits of a values when the value is negative; and a summer for adding a single bit to each selectively bit inverted value.

\* \* \* \* \*